US012748316B2

(12) United States Patent
Soma et al.

(10) Patent No.: US 12,748,316 B2
(45) Date of Patent: Sep. 29, 2026

(54) POLARIZED LIGHT SEPARATION ELEMENT AND OPTICAL RECEPTION DEVICE

(71) Applicants: HAMAMATSU PHOTONICS K.K., Hamamatsu (JP); The University of Tokyo, Tokyo (JP)

(72) Inventors: Go Soma, Tokyo (JP); Yoshiro Nomoto, Hamamatsu (JP); Yoshiaki Nakano, Tokyo (JP); Takuo Tanemura, Tokyo (JP)

(73) Assignees: HAMAMATSU PHOTONICS K.K., Hamamatsu (JP); The University of Tokyo, Tokyo (JP)

( * ) Notice: Subject to any disclaimer, the term of this patent is extended or adjusted under 35 U.S.C. 154(b) by 233 days.

(21) Appl. No.: 18/832,309

(22) PCT Filed: Jan. 26, 2023

(86) PCT No.: PCT/JP2023/002502

§ 371 (c)(1),
(2) Date: Jul. 23, 2024

(87) PCT Pub. No.: WO2023/157600

PCT Pub. Date: Aug. 24, 2023

(65) Prior Publication Data

US 2025/0110346 A1 Apr. 3, 2025

(30) Foreign Application Priority Data

Feb. 21, 2022 (JP) ................................ 2022-024837

(51) Int. Cl.

*G02B 27/28* (2006.01)
*G02B 5/30* (2006.01)
*H04B 10/67* (2013.01)

(52) U.S. Cl.

CPC ......... *G02B 27/283* (2013.01); *G02B 5/3025* (2013.01); *H04B 10/67* (2013.01)

(58) Field of Classification Search

CPC ...... G02B 27/283; G02B 5/3025; G02B 5/30; H04B 10/67; H04B 10/532; G01J 4/04

(Continued)

(56) References Cited

U.S. PATENT DOCUMENTS 9,739,918 B2 * 8/2017 Arbabi .................. G02B 5/021
11,487,051 B2 * 11/2022 Yao ...................... G02B 5/3041

(Continued)

FOREIGN PATENT DOCUMENTS

JP 2017-527857 A 9/2017
JP 2021-511553 A 5/2021

(Continued)

OTHER PUBLICATIONS

Arbabi, E. et al., "Full-Stokes imaging polarimetry using dielectric metasurfaces," ACS Photonics vol. 5, 2018, pp. 3132-3140.

(Continued)

*Primary Examiner* — William R Alexander

(74) *Attorney, Agent, or Firm* — Faegre Drinker Biddle & Reath LLP

(57) ABSTRACT

A polarization splitting device includes a substrate, and a polarization splitting layer having a structure element pattern including a plurality of structure elements each having two-fold rotational symmetry, and formed on an upper surface of the substrate. The polarization splitting layer splits first to sixth polarization components included in object light, and focuses respectively at first to sixth focal positions on a focal plane. The structure element pattern includes a first structure element pattern for focusing the first and second polarization components, a second structure element pattern for focusing the third and fourth polarization (Continued)

(a)

(b)

components, and a third structure element pattern for focusing the fifth and sixth polarization components, and a pattern constituted by a first structure element, a second structure element, and a third structure element is set as a unit pattern, and a plurality of unit patterns are two-dimensionally arranged.

16 Claims, 19 Drawing Sheets

(58) Field of Classification Search
USPC .................................................... 359/483.01
See application file for complete search history.

(56) References Cited

U.S. PATENT DOCUMENTS

| | | | | |
|---|---|---|---|---|
| 12,204,071 | B2* | 1/2025 | Alù | G02B 27/283 |
| 2016/0077261 | A1 | 3/2016 | Arbabi et al. | |
| 2016/0127048 | A1* | 5/2016 | Kikuchi | H04B 10/613 398/202 |
| 2018/0316880 | A1* | 11/2018 | Rephaeli | G02B 5/1871 |
| 2019/0181950 | A1* | 6/2019 | Ishimura | H04B 10/079 |
| 2021/0048569 | A1* | 2/2021 | Rubin | G02B 5/3025 |
| 2021/0286188 | A1* | 9/2021 | Rubin | G02B 1/002 |
| 2021/0348969 | A1* | 11/2021 | Yao | G02B 5/201 |
| 2021/0396914 | A1* | 12/2021 | You | G01B 11/25 |
| 2022/0214219 | A1 | 7/2022 | Faraon et al. | |
| 2022/0236453 | A1* | 7/2022 | Alù | G02B 27/1013 |
| 2023/0288716 | A1* | 9/2023 | Rubin | G02B 1/002 |
| 2025/0028182 | A1* | 1/2025 | Rubin | G03H 1/0244 |

FOREIGN PATENT DOCUMENTS

| | | | |
|---|---|---|---|
| WO | WO-2014/189107 | A1 | 11/2014 |
| WO | WO-2016/044104 | A1 | 3/2016 |
| WO | WO-2018/062010 | A1 | 4/2018 |
| WO | WO-2019/147828 | A1 | 8/2019 |

OTHER PUBLICATIONS

Arbabi, A. et al., "Dielectric metasurfaces for complete control of phase and polarization with subwavelength spatial resolution and high transmission," Nature Nanotechnology vol. 10, 2015, pp. 937-943.
Dong, P. et al., "128-Gb/s 100-km transmission with direct detection using silicon photonic Stokes vector receiver and I/Q modulator," Optics Express vol. 24, 2016, pp. 14208-14214.
Fan, Q. et al., "Visible light focusing flat lenses based on hybrid dielectric-metal metasurface reflector-arrays," Scientific Reports vol. 7, 45044, 2017.
Kikuchi, K. et al., "Multi-level signaling in the Stokes space and its application to large-capacity optical communications," Optics Express vol. 22, 2014, pp. 7374-7387.
International Preliminary Report on Patentability mailed Sep. 6, 2024 for PCT/JP2023/002502.

* cited by examiner

POLARIZED LIGHT SEPARATION ELEMENT AND OPTICAL RECEPTION DEVICE

TECHNICAL FIELD

The present disclosure relates to a polarization splitting device for splitting polarization components of object light, and focusing the polarization components at focal positions different from each other, and an optical receiver apparatus using the polarization splitting device.

BACKGROUND ART

Non Patent Document 1 discloses a technique for performing imaging of Stokes parameters by measuring six polarization components of object light of an x direction linear polarization component, a y direction linear polarization component, a +45° linear polarization component, a −45° linear polarization component, a left-handed circular polarization component, and a right-handed circular polarization component. In the configuration described in Non Patent Document 1, splitting and focusing of each of the polarization components included in the object light are performed by using a subwavelength metasurface structure.

Non Patent Document 2 discloses a technique of splitting and focusing two polarization components of, for example, a left-handed circular polarization component and a right-handed circular polarization component. In the configuration described in Non Patent Document 2, a configuration of a reflection type is used in which the polarization components of the object light are split by the metasurface structure formed on a metal layer which reflects the object light. Further, Patent Document 1 and Non Patent Document 3 describe control of a phase and a polarization by using the metasurface structure.

CITATION LIST

Patent Literature

Patent Document 1: US Patent Application Publication No. 2016/0077261

Non Patent Literature

Non Patent Document 1: E. Arbabi et al., “Full-Stokes imaging polarimetry using dielectric metasurfaces”, ACS Photonics Vol. 5 (2018), pp. 3132-3140

Non Patent Document 2: Q. Fan et al., “Visible light focusing flat lenses based on hybrid dielectric-metal metasurface reflector-arrays”, Scientific Reports Vol. 7, 45044 (2017)

Non Patent Document 3: A. Arbabi et al., “Dielectric metasurfaces for complete control of phase and polarization with subwavelength spatial resolution and high transmission”, Nature Nanotechnology Vol. 10 (2015), pp. 937-943

Non Patent Document 4: P. Dong et al., “128-Gb/s 100-km transmission with direct detection using silicon photonic Stokes vector receiver and I/Q modulator”, Optics Express Vol. 24 (2016), pp. 14208-14214

Non Patent Document 5: K. Kikuchi et al., “Multi-level signaling in the Stokes space and its application to large-capacity optical communications”, Optics Express Vol. 22 (2014), pp. 7374-7387

SUMMARY OF INVENTION

Technical Problem

In recent years, with the expansion of cloud services, the spread of the concept of the Internet of Things (IoT), and the like, short range communication traffic between data centers and the like has increased. In the short range communication described above, for example, an intensity modulation-direct detection (IM-DD) method is used in which information is put on an intensity of light used for the communication, and the light intensity is directly detected by a light receiving element.

Further, in order to enable further high capacity transmission, an optical communication system with the high spectral use efficiency has been developed (for example, see Non Patent Document 4). As one of the optical communication systems described above, a pulse amplitude modulation (PAM) method has been studied. However, in the PAM method, only one-dimensional modulation with respect to the intensity of the light can be performed, and thus, there is a problem in that it is difficult to increase the modulation level.

On the other hand, as a communication method capable of using a multi-dimensional space while using the direct detection, a Stokes vector modulation-direct detection (SVM-DD) method using a polarization state of light has attracted attention (for example, see Non Patent Documents 4 and 5). In the SVM-DD method, polarization components of the light are modulated, and values are assigned to a Stokes vector (Stokes parameters) corresponding to each polarization state, and thus, the transmission of information is performed.

According to the above SVM-DD method, three-dimensional light modulation by using the three-dimensional Stokes space can be performed by using three degrees of freedom of intensities of two polarization components orthogonal to each other, and a relative phase difference thereof. Further, only the relative phase information between the polarization components is used, and thus, the signal can be received by the direct detection, and a coherent system is not required.

For example, in FIG. 4 of Non Patent Document 5, an example of an arrangement of signal points in each of the cases of two values, four values, and eight values in the three-dimensional Stokes space is illustrated. As can be understood from this diagram, the SVM-DD method uses the three-dimensional space, and thus, the spectral efficiency can be improved as compared with the conventional method even in the configuration of using the simple direct detection method.

In a receiver of the optical signal used in the SVM-DD method, for example, as a configuration example of an optical integrated circuit shown in FIG. 1 of Non Patent Document 4, there is a problem in that configurations of an optical system and an optical circuit become complicated. On the other hand, it is considered possible to use polarization control by the metasurface structure in the receiver of the optical signal. However, for example, in the configuration described in Non Patent Document 1, metasurface structure element groups respectively corresponding to the polarization components are divided and arranged in sections different from each other. In the above configuration, when application to the optical communication is considered, there is a problem in that the symmetry is low because the functions are divided according to the positions. Further, in the configuration described in Non Patent Document 2, only the two polarization components can be focused, and thus, it is not possible to obtain all the Stokes parameters.

An object of an embodiment is to provide a polarization splitting device and an optical receiver apparatus capable of suitably performing splitting and focusing of polarization components of object light with a simple configuration.

Solution to Problem

An embodiment is a polarization splitting device. The polarization splitting device includes (1) a substrate having a transmitting property for object light; and (2) a polarization splitting layer made of a material having a transmitting property for the object light and with a refractive index higher than that of the substrate, having a structure element pattern including a plurality of structure elements each having two-fold rotational symmetry, and formed on an upper surface of the substrate, and the polarization splitting device has a configuration of a transmission type in which one surface of a lower surface of the substrate and an upper surface of the polarization splitting layer is set as a light incident surface, and another surface is set as a light output surface, (3) the polarization splitting layer splits first to sixth polarization components included in the object light incident from the light incident surface side, and focuses the first to sixth polarization components respectively at first to sixth focal positions different from each other on a focal plane set on the light output surface side, and (4) the structure element pattern includes a first structure element pattern including a plurality of first structure elements, and for focusing the first polarization component and the second polarization component respectively at the first focal position and the second focal position; a second structure element pattern including a plurality of second structure elements, and for focusing the third polarization component and the fourth polarization component respectively at the third focal position and the fourth focal position; and a third structure element pattern including a plurality of third structure elements, and for focusing the fifth polarization component and the sixth polarization component respectively at the fifth focal position and the sixth focal position, and a pattern of a linear shape or a triangular shape constituted by the first structure element, the second structure element, and the third structure element is set as a unit pattern, and a plurality of unit patterns are two-dimensionally arranged on the upper surface of the substrate.

In the polarization splitting device of the above configuration, the structure element pattern including the plurality of structure elements is formed in the polarization splitting layer on the substrate, and by using the above structure element pattern, the first to sixth polarization components included in the object light which is incident from the light incident surface side are split and focused respectively on the first to sixth focal positions different from each other set on the focal plane. Further, the structure element pattern is constituted by the first structure element pattern for splitting and focusing the first polarization component and the second polarization component, the second structure element pattern for splitting and focusing the third polarization component and the fourth polarization component, and the third structure element pattern for splitting and focusing the fifth polarization component and the sixth polarization component.

Further, in the above configuration, as for the arrangement of the plurality of structure elements including the first to third structure elements on the upper surface (pattern forming surface) of the substrate, the pattern including the three structure elements of the first structure element, the second structure element, and the third structure element is defined as the unit pattern, and further, the plurality of unit patterns are arranged in the two-dimensional arrangement on the substrate. According to the above configuration, the first to third structure elements are uniformly distributed and arranged on the substrate, and it is possible to perform splitting and focusing of the first to sixth polarization components of the object light which is incident on the device with good symmetry and with a simple configuration.

An embodiment is an optical receiver apparatus. The optical receiver apparatus includes the polarization splitting device of the above configuration; and a photodetection unit for detecting the first to sixth polarization components of the object light respectively focused at the first to sixth focal positions on the focal plane. According to the above configuration, it is possible to suitably detect the light intensity of each of the first to sixth polarization components of the object light which are split and focused by the polarization splitting device described above in the photodetection unit.

Advantageous Effects of Invention

According to the polarization splitting device and the optical receiver apparatus of the embodiments, it is possible to suitably perform splitting and focusing of the polarization components of the object light with a simple configuration.

DESCRIPTION OF EMBODIMENTS

Figure 1:
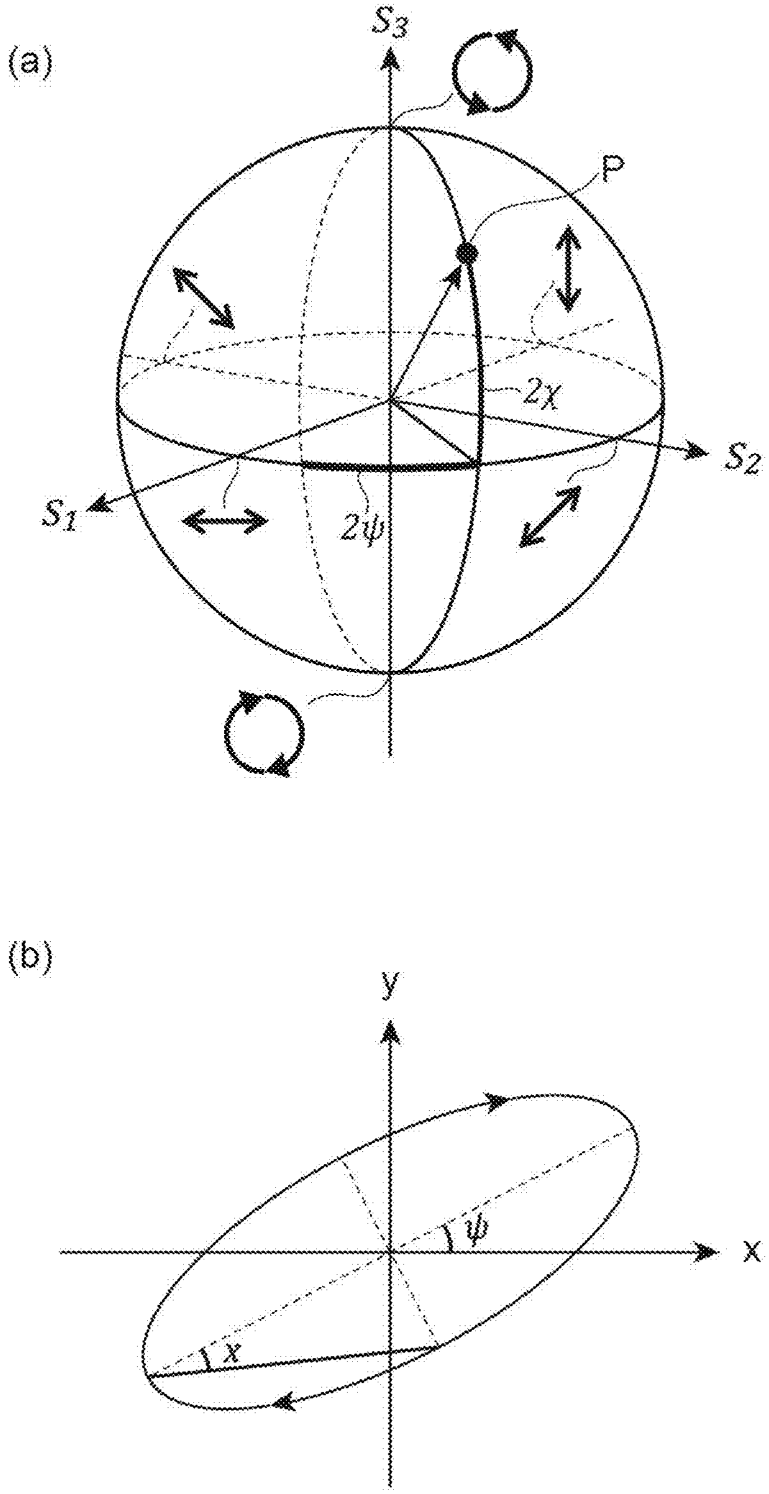
FIG. 1 includes diagrams schematically illustrating (a) a Poincare sphere in a Stokes space and six polarization components corresponding to respective Stokes parameters, and (b) a polarization state of light corresponding to a point P on the Poincare sphere.

Hereinafter, embodiments of a polarization splitting device and an optical receiver apparatus will be described in detail with reference to the accompanying drawings. In the description of the drawings, the same elements will be denoted by the same reference signs, and redundant description will be omitted. Further, the dimensional ratios in the drawings are not always coincident with those in the description.

First, polarization components of light which is to be an object of polarization splitting by a polarization splitting device, Stokes parameters, and the like will be briefly described. In the following description, a propagation direction of the object light is set to a z axis, and two axes orthogonal to the z axis are set to an x axis and a y axis. A polarization state of the light can be represented by a Stokes vector S with the Stokes parameters $S_1$, $S_2$, and $S_3$ defined by the following Formula (1).

[Formula 1]

$$\begin{bmatrix} S_1 \\ S_2 \\ S_3 \end{bmatrix} = \begin{bmatrix} |E_x|^2 - |E_y|^2 \\ 2\,Re\left(E_x E_y^*\right) \\ 2\,Im\left(E_x E_y^*\right) \end{bmatrix} = \begin{bmatrix} |E_x|^2 - |E_y|^2 \\ 2(|E_x||E_y|\cos\delta) \\ 2(|E_x||E_y|\sin\delta) \end{bmatrix} \quad (1)$$

In this case, $E_x$ is an amplitude of the polarization component in the x axis direction, $E_y$ is an amplitude of the polarization component in the y axis direction, and δ is a relative phase (phase difference) between the polarization components.

Further, a three-dimensional space defined by the Stokes parameters described above is referred to as a Stokes space. When the Stokes vector $S=(S_1, S_2, S_3)$ is plotted in the Stokes space, an arbitrary polarization state can be represented by a point in the space. In particular, in the case in which each of the Stokes parameters is normalized by the light intensity, the points corresponding to the polarization states of the light are distributed on a unit sphere in the Stokes space. The above unit sphere is referred to as a Poincare sphere.

In the Stokes vector S, the parameter $S_1$ corresponds to the intensity difference between the x direction linear polarization component and the y direction linear polarization component, the parameter $S_2$ corresponds to the intensity difference between the +45° linear polarization component and the −45° linear polarization component, and the parameter $S_3$ corresponds to the intensity difference between the left-handed circular polarization component and the right-handed circular polarization component. (a) in FIG. 1 illustrates the Poincare sphere in the Stokes space, and the above six polarization components respectively corresponding to the Stokes parameters, and (b) in FIG. 1 illustrates the polarization state of the light corresponding to the point P set on the Poincare sphere.

As can be understood from the above description, the Stokes parameters $S_1$, $S_2$, and $S_3$ of the object light can be obtained by detecting the light intensities of the six polarization components of the object light, for example, the x direction linear polarization component, the y direction linear polarization component, the +45° linear polarization component, the −45° linear polarization component, the left-handed circular polarization component, and the right-handed circular polarization component, and obtaining the difference between the light intensities. The polarization splitting device which is described in the following enables splitting and focusing of the polarization components of the object light described above.

Figure 2:
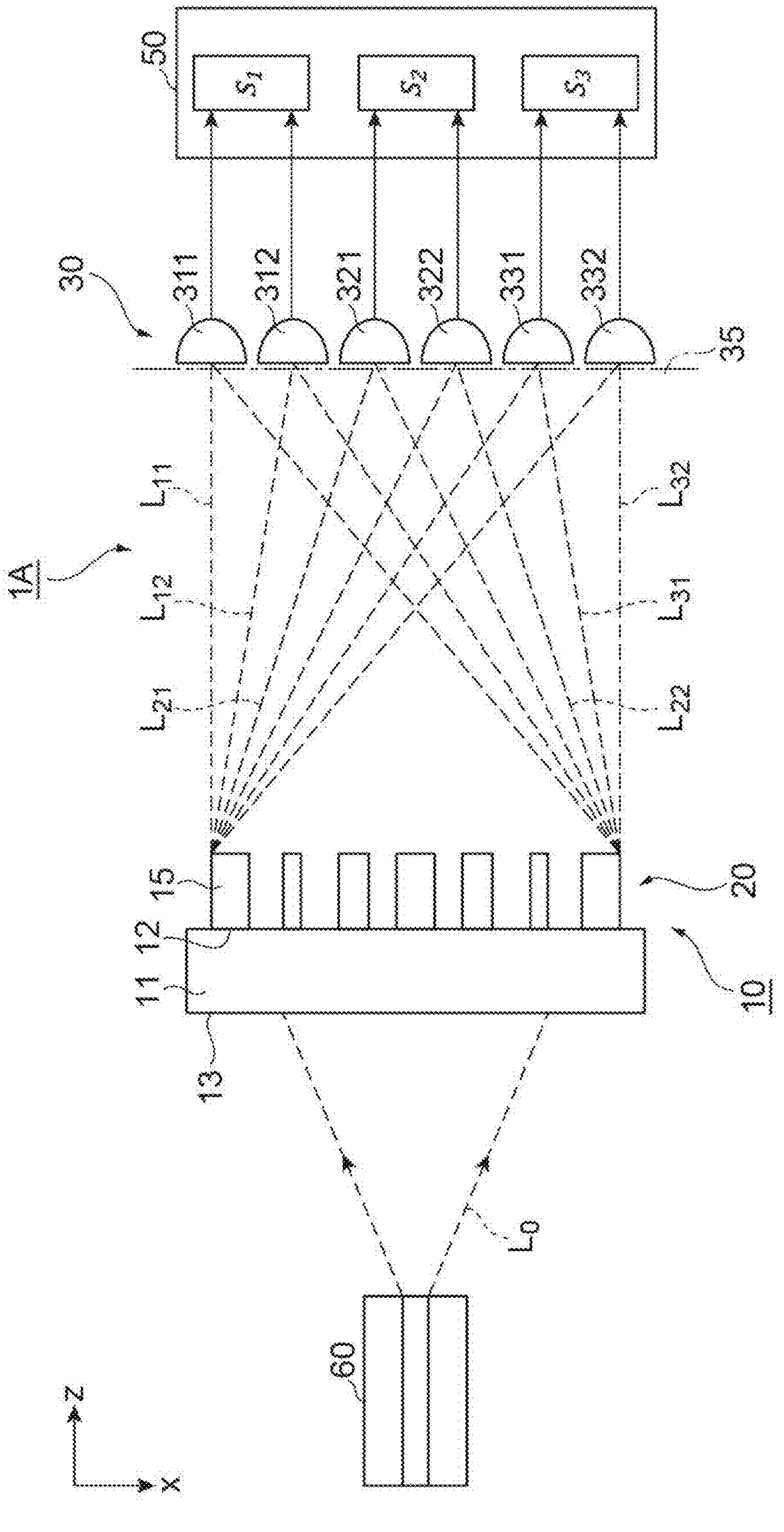
FIG. 2 is a schematic diagram illustrating a configuration of an optical receiver apparatus including a polarization splitting device according to an embodiment.

FIG. 2 is a schematic diagram illustrating a configuration of an optical receiver apparatus including a polarization splitting device according to an embodiment. In this case, in each of the following diagrams, an xyz orthogonal coordinate system is also illustrated as necessary for ease of description. In the above coordinate system, the z axis indicates the propagation direction of the object light $L_0$ serving as the object of polarization splitting as described above, and the x axis and the y axis indicate two axes orthogonal to the z axis.

An optical receiver apparatus 1A according to the present embodiment includes a polarization splitting device 10, a photodetection unit 30, and an analysis unit 50. Further, the polarization splitting device 10 is a device for splitting the polarization components included in the object light $L_0$, and focusing the polarization components respectively at predetermined focal positions, and includes a substrate 11 and a polarization splitting layer 15. In addition, in FIG. 2, as an example of the object light $L_0$, light of a predetermined wavelength which is output from an output end face of an optical fiber 60 is illustrated. The wavelength λ of the object light $L_0$ is set to, for example, 1.55 μm used in the communication wavelength band.

The substrate 11 is made of a material having a transmitting property for the object light $L_0$ of the wavelength λ. The polarization splitting device 10 illustrated in FIG. 2 has a configuration of a transmission type, and a lower surface 13 of the substrate 11 is set as a light incident surface on which the object light $L_0$ is incident, and an upper surface 12 is set as a pattern forming surface on which a structure element pattern 20 of the polarization splitting layer 15 to be described later is formed.

As the material constituting the substrate 11, an arbitrary material may be used as long as the material can form and support the polarization splitting layer 15 and has the transmitting property for the object light $L_0$. As the material of the substrate 11 described above, for example, an oxide material or a fluoride material can be used. Specific examples of the oxide material include quartz ($SiO_2$), BK7, $Al_2O_3$, and the like. Further, specific examples of the fluoride material include $MgF_2$, $CaF_2$, LiF, and the like.

The polarization splitting layer 15 is made of a material having a transmitting property for the object light $L_0$ and with a refractive index higher than that of the substrate 11, and is formed on the upper surface 12 of the substrate 11. Further, the polarization splitting layer 15 has the structure element pattern 20 including a plurality of structure elements each having a two-fold rotational symmetric property, and is formed to have a configuration for splitting the first to sixth polarization components included in the object light $L_0$ incident from the lower surface 13 side of the substrate 11, and focusing the first to sixth polarization components respectively at the first to sixth focal positions different from each other on a focal plane 35 set on a side opposite to the substrate 11. In the above configuration, an upper surface (a surface opposite to the substrate 11) of the polarization splitting layer 15 serves as a light output surface from which the object light $L_0$ is output.

As the material constituting the plurality of structure elements in the polarization splitting layer 15, an arbitrary material may be used as long as the material has the transmitting property for the object light $L_0$ and has the refractive index higher than that of the substrate 11, and further, a dielectric material is preferably used, and in addition, a semiconductor material or an oxide material is preferably used. Specific examples of the semiconductor material include Si which is a group IV semiconductor material, GaAs, InP, GaN, and InGaAs which are III-V semiconductor materials, and the like. Further, specific examples of the oxide material include $TiO_2$, $Ta_2O_5$, $Nb_2O_5$, $HfO_2$, $ZrO_2$, $Y_2O_3$, $Gd_2O_3$, $CeO_2$, $Al_2O_3$, and the like. Further, as the material of the polarization splitting layer 15, a nitride material such as $Si_3N_4$ or the like may be used.

Further, as for the first to sixth polarization components of the object light $L_0$ which are split by the structure element pattern 20 of the polarization splitting layer 15, in the following description, as a specific example, the first polarization component is set to the x direction linear polarization component $L_{11}$, the second polarization component is set to the y direction linear polarization component $L_{12}$, the third polarization component is set to the +45° linear polarization component $L_{21}$, the fourth polarization component is set to the −45° linear polarization component $L_{22}$, the fifth polarization component is set to the left-handed circular polarization component $L_{31}$, and the sixth polarization component is set to the right-handed circular polarization component $L_{32}$. By setting the first to sixth polarization components as described above, the Stokes parameters $S_1$, $S_2$, and $S_3$ of the object light $L_0$ can be suitably obtained from the measurement result of the polarization components. In addition, the details of the configuration of the structure element pattern 20 for splitting the polarization components of the object light $L_0$ will be described later.

The photodetection unit 30 detects the polarization components $L_{11}$, $L_{12}$, $L_{21}$, $L_{22}$, $L_{31}$, and $L_{32}$ of the object light $L_0$ respectively focused at the first to sixth focal positions on the focal plane 35 by the polarization splitting device 10. In the optical receiver apparatus 1A of the present embodiment, the photodetection unit 30 has a configuration including first to sixth photodetectors 311, 312, 321, 322, 331, and 332 which are arranged corresponding to the first to sixth focal positions on the focal plane 35 and for respectively detecting the polarization components described above. In addition, in FIG. 2, for convenience of description, the above photodetectors are illustrated to be arranged one-dimensionally, and further, in the actual case, the arrangement of the photodetectors in the photodetection unit 30 is, for example, as illustrated in FIG. 3.

Figure 3:
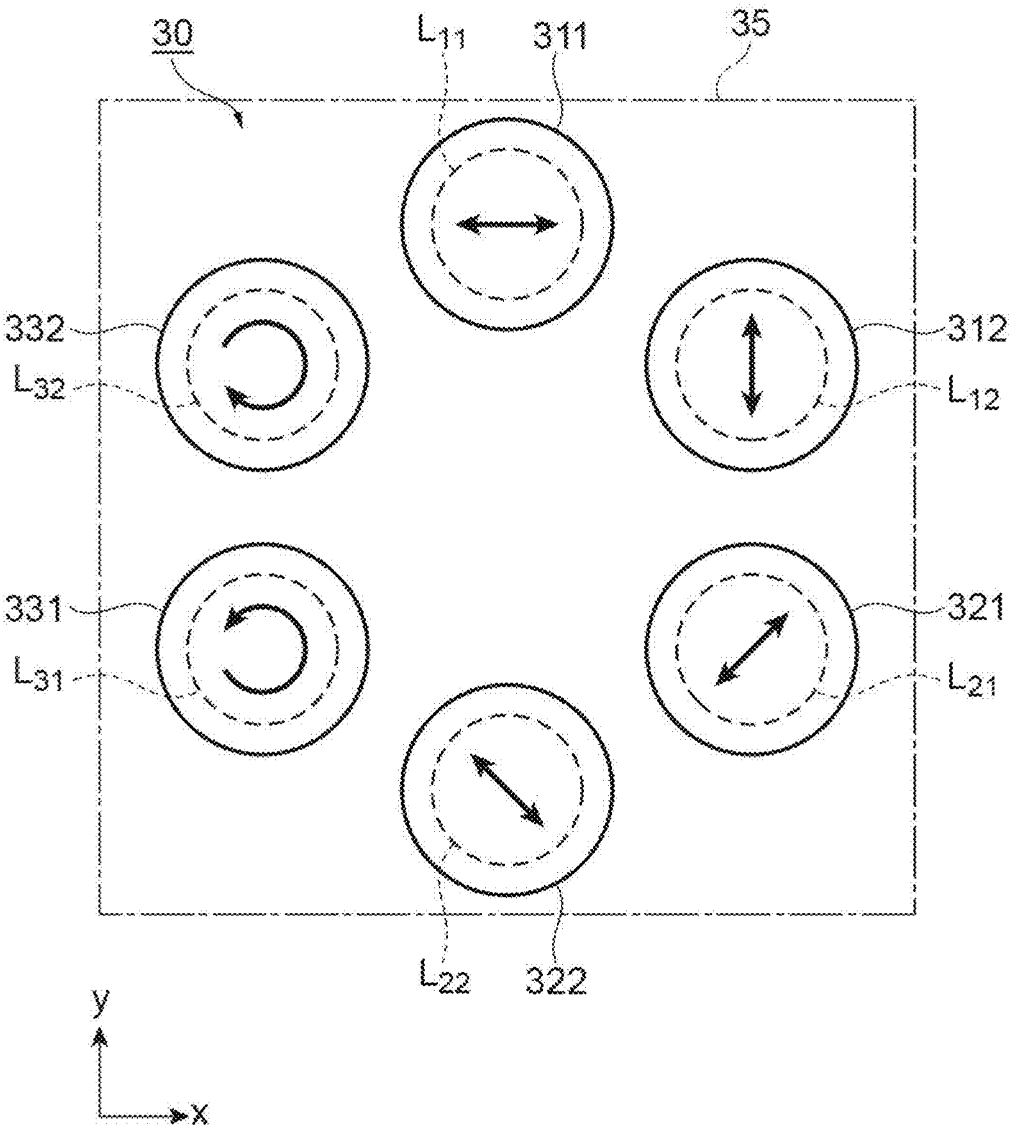
FIG. 3 is a plan view illustrating an arrangement configuration of photodetectors in a photodetection unit.

FIG. 3 is a plan view illustrating the setting of the first to sixth focal positions on the focal plane 35, and the arrangement configuration of the photodetectors in the photodetection unit 30. In the present embodiment, as illustrated in FIG. 3, the focal positions on which the polarization components $L_{11}$, $L_{12}$, $L_{21}$, $L_{22}$, $L_{31}$, and $L_{32}$ of the object light $L_0$ are focused are respectively arranged at vertices of a regular hexagon set on the focal plane 35, and the photodetectors 311, 312, 321, 322, 331, and 332 constituting the photodetection unit 30 are respectively arranged at the corresponding focal positions.

In the configuration illustrated in FIG. 3, specifically, the photodetector 311 corresponding to the x direction linear polarization component Ln is arranged at an upper position on the focal plane 35. The photodetector 312 corresponding to the y direction linear polarization component $L_{12}$ is arranged at an upper right position. The photodetector 321 corresponding to the +45° linear polarization component $L_{21}$ is arranged at a lower right position. The photodetector 322 corresponding to the −45° linear polarization component $L_{22}$ is arranged at a lower position. The photodetector 331 corresponding to the left-handed circular polarization component $L_{31}$ is arranged at a lower left position. The photodetector 332 corresponding to the right-handed circular polarization component $L_{32}$ is arranged at an upper left position.

As described above, in the configuration in which the photodetectors are individually provided for the respective polarization components of the object light $L_0$ in the photodetection unit 30, a photodetector such as a zero-dimensional photodetector or the like operating at a high speed can be used as the photodetector. As the photodetector described above, for example, a photodiode (for example, a pin photodiode), a photomultiplier tube, or the like can be used. Each of the photodetectors of the photodetection unit 30 detects the corresponding polarization component, and outputs a detection signal indicating the detected light intensity.

In addition, in the above configuration, the focal positions of the respective polarization components of the object light $L_0$ and the respective photodetectors of the photodetection unit 30 corresponding to the focal positions are arranged at the vertices of the regular hexagon set on the focal plane 35, and in addition, as for the arrangement of the focal positions and the photodetectors on the focal plane 35, the arrangement is not limited to the configuration described above, and specifically, various arrangement configurations can be used.

Referring again to FIG. 2. The analysis unit 50 inputs the detection signal output from each of the photodetectors of the photodetection unit 30, and performs necessary analysis on the detection result of the respective polarization components of the object light $L_0$ by the photodetection unit 30. Specifically, for example, the analysis unit 50 obtains the Stokes parameters of the object light $L_0$ based on the detection result by the photodetection unit 30.

In the configuration illustrated in FIG. 2, in the analysis unit 50, the Stokes parameter $S_1$ is obtained based on the detection result of the x direction linear polarization component Lu by the photodetector 311 and the detection result of the y direction linear polarization component $L_{12}$ by the photodetector 312. Further, the Stokes parameter $S_2$ is obtained based on the detection result of the +45° linear polarization component $L_{21}$ by the photodetector 321 and the detection result of the −45° linear polarization component $L_{22}$ by the photodetector 322. Further, the Stokes parameter $S_3$ is obtained based on the detection result of the left-handed circular polarization component $L_{31}$ by the photodetector 331 and the detection result of the right-handed circular polarization component $L_{32}$ by the photodetector 332.

The configuration including the analysis unit 50 as described above is suitable, for example, in the case in which the optical receiver apparatus 1A is applied to the optical communication by using the SVM-DD method. In addition, the analysis unit 50 may not be provided if it is not necessary.

Figure 4:
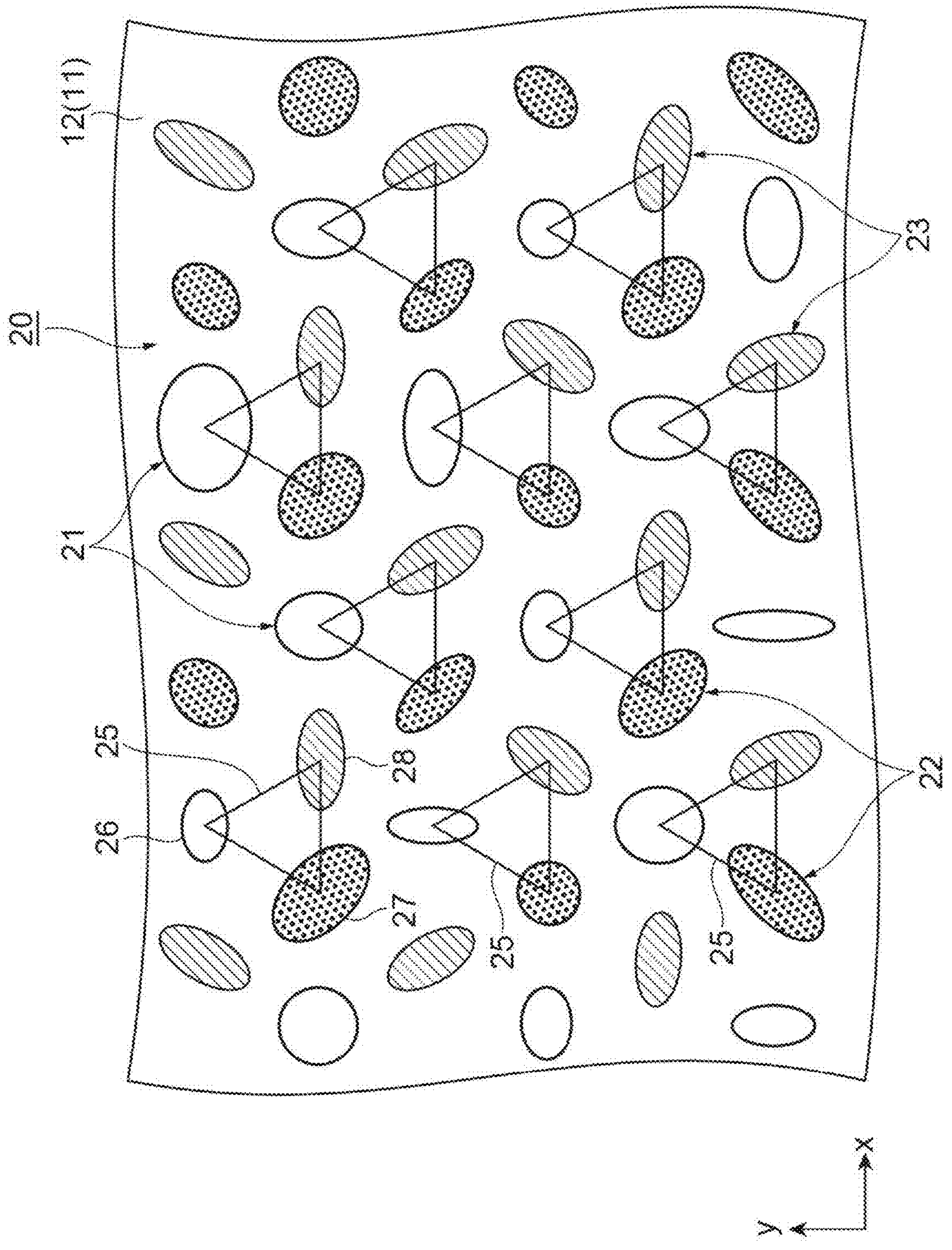
FIG. 4 is a plan view schematically illustrating a configuration of a structure element pattern in the polarization splitting device.

The specific configuration of the structure element pattern 20 in the polarization splitting layer 15 of the polarization splitting device 10 will be described with reference to FIG. 4. FIG. 4 is a plan view schematically illustrating the configuration of the structure element pattern 20 in the polarization splitting device 10.

Each of the plurality of structure elements constituting the structure element pattern 20 has a shape with the two-fold rotational symmetry on the upper surface 12 of the substrate 11. In FIG. 4, an elliptical post is illustrated as a preferred example of the structure element having the shape described above. A length in a major axis direction, a length in a minor axis direction, and an inclination angle with respect to the x axis, which define the shape of each of the elliptical posts, are individually and appropriately set in consideration of the function of the structure element pattern 20.

Further, in the structure element pattern 20, a size of each of the plurality of structure elements on the upper surface 12 of the substrate 11, and a height of each of the plurality of structure elements from the upper surface 12 are preferably respectively set to be less than the wavelength 2 of the object light $L_0$. In this case, as for the size of the structure element, for example, in the case in which the structure element is set to the elliptical post, the length of the elliptical post in the major axis direction is preferably set to be less than the wavelength λ of the object light $L_0$. Further, in the structure element pattern 20, an arrangement distance of the plurality of structure elements is preferably set to be less than the wavelength λ of the object light $L_0$. By setting the size, the height, and the arrangement distance of the plurality of structure elements in the structure element pattern 20 as described above with respect to the wavelength λ, the structure element pattern 20 functions as a subwavelength metasurface structure.

As described above, the polarization splitting layer 15 splits the respective polarization components included in the object light $L_0$ and focuses the polarization components respectively at the corresponding focal positions on the focal plane 35. In order to realize the above functions of splitting and focusing of the polarization components, as illustrated in FIG. 4, the structure element pattern 20 of the subwavelength structure including the plurality of structure elements has a configuration including three types of structure element patterns of a first structure element pattern 21, a second structure element pattern 22, and a third structure element pattern 23.

The first structure element pattern 21 includes a plurality of first structure elements 26, and focuses the x direction linear polarization component Lu and the y direction linear polarization component $L_{12}$ respectively on the first focal position and the second focal position at which the photodetector 311 and the photodetector 312 are arranged.

The second structure element pattern 22 includes a plurality of second structure elements 27, and focuses the +45° linear polarization component $L_{21}$ and the −45° linear polarization component $L_{22}$ respectively on the third focal position and the fourth focal position at which the photodetector 321 and the photodetector 322 are arranged.

The third structure element pattern 23 includes a plurality of third structure elements 28, and focuses the left-handed circular polarization component $L_{31}$ and the right-handed circular polarization component $L_{32}$ respectively on the fifth focal position and the sixth focal position at which the photodetector 331 and the photodetector 332 are arranged.

Further, as for the arrangement of the first to third structure elements 26 to 28 constituting the first to third structure element patterns 21 to 23 on the substrate 11, as illustrated by a solid line connecting the structure elements in FIG. 4, the structure element pattern 20 has a configuration in which a linear shape pattern or a triangular shape pattern constituted by the first structure element 26, the second structure element 27, and the third structure element 28 is set as a unit pattern 25, and a plurality of unit patterns 25 are two-dimensionally arranged on the upper surface 12 of the substrate 11.

In the configuration illustrated in FIG. 4, the unit pattern 25 is set to a pattern of an equilateral triangular shape, and the first structure element 26 is arranged at an upper vertex, the second structure element 27 is arranged at a lower left vertex, and the third structure element 28 is arranged at a lower right vertex. Further, the structure element pattern 20 illustrated in FIG. 4 is set to a pattern having a hexagonal lattice arrangement (equilateral triangular lattice arrangement), as the arrangement of the first to third structure elements 26 to 28 illustrated in FIG. 5 together with a hexagonal lattice A.

Figure 5:
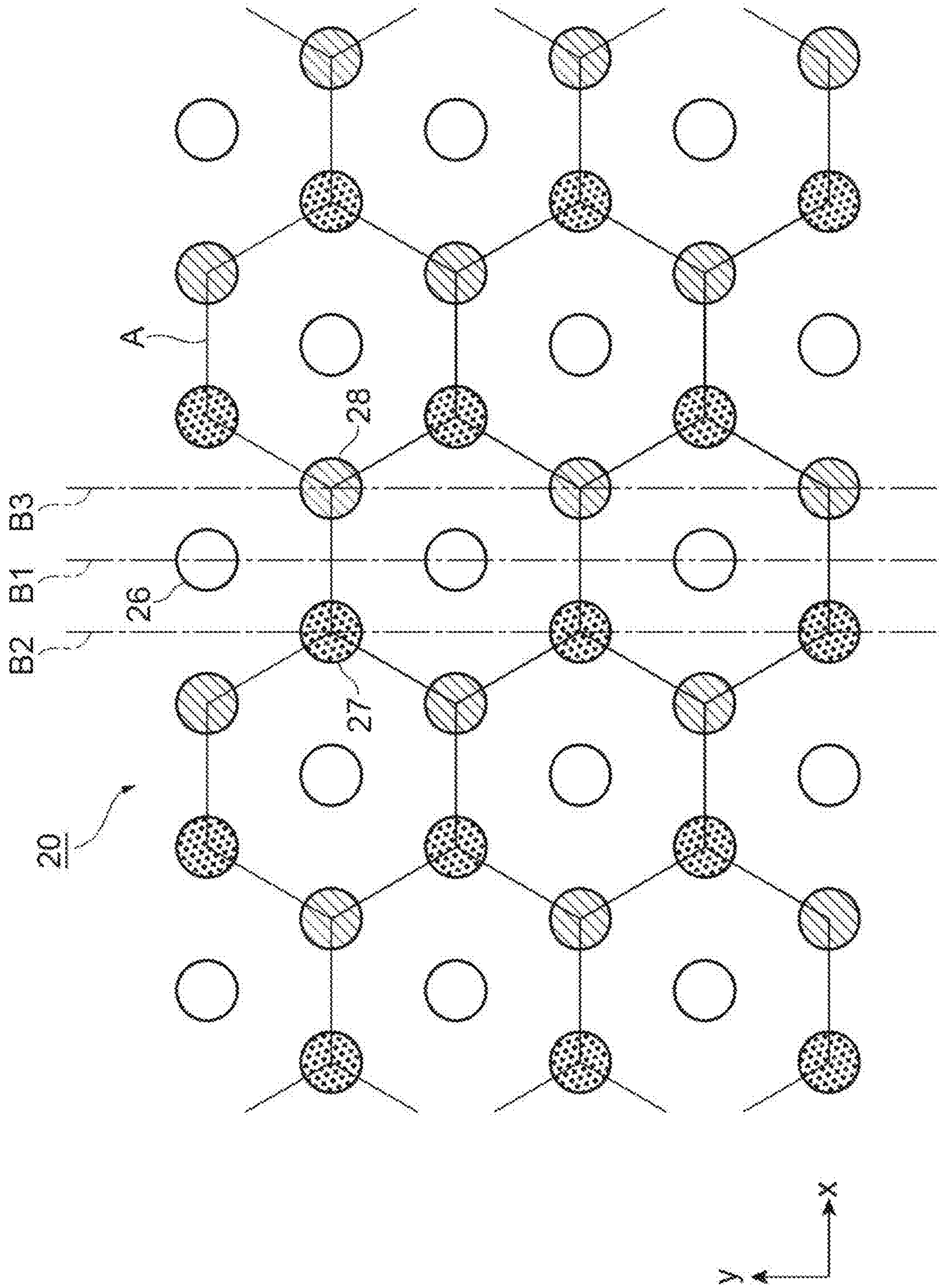
FIG. 5 is a diagram illustrating an arrangement of a plurality of structure elements in the structure element pattern.

Further, the arrangement of the first to third structure elements 26 to 28 illustrated in FIG. 4 and FIG. 5 has a configuration in which, as illustrated in FIG. 5 with straight lines B1 to B3 extending in the y axis direction, the straight line B2 on which the second structure elements 27 are arranged at equal intervals, the straight line B1 on which the first structure elements 26 are arranged at equal intervals, and the straight line B3 on which the third structure elements 28 are arranged at equal intervals, are arranged at equal intervals in the x axis direction such that the structure elements are arranged alternately.

As for splitting and focusing of the respective polarization components by the structure element pattern 20, specifically, the plurality of first structure elements 26 of the first structure element pattern 21 include the structure elements used for focusing of the x direction linear polarization component Lu and the structure elements used for focusing of the y direction linear polarization component $L_{12}$. The plurality of second structure elements 27 of the second structure element pattern 22 include the structure elements used for focusing of the +45° linear polarization component $L_{21}$ and the structure elements used for focusing of the −45° linear polarization component $L_{22}$. The plurality of third structure elements 28 of the third structure element pattern 23 include the structure elements used for focusing of the left-handed circular polarization component $L_{31}$ and the structure elements used for focusing of the right-handed circular polarization component $L_{32}$.

Figure 6:
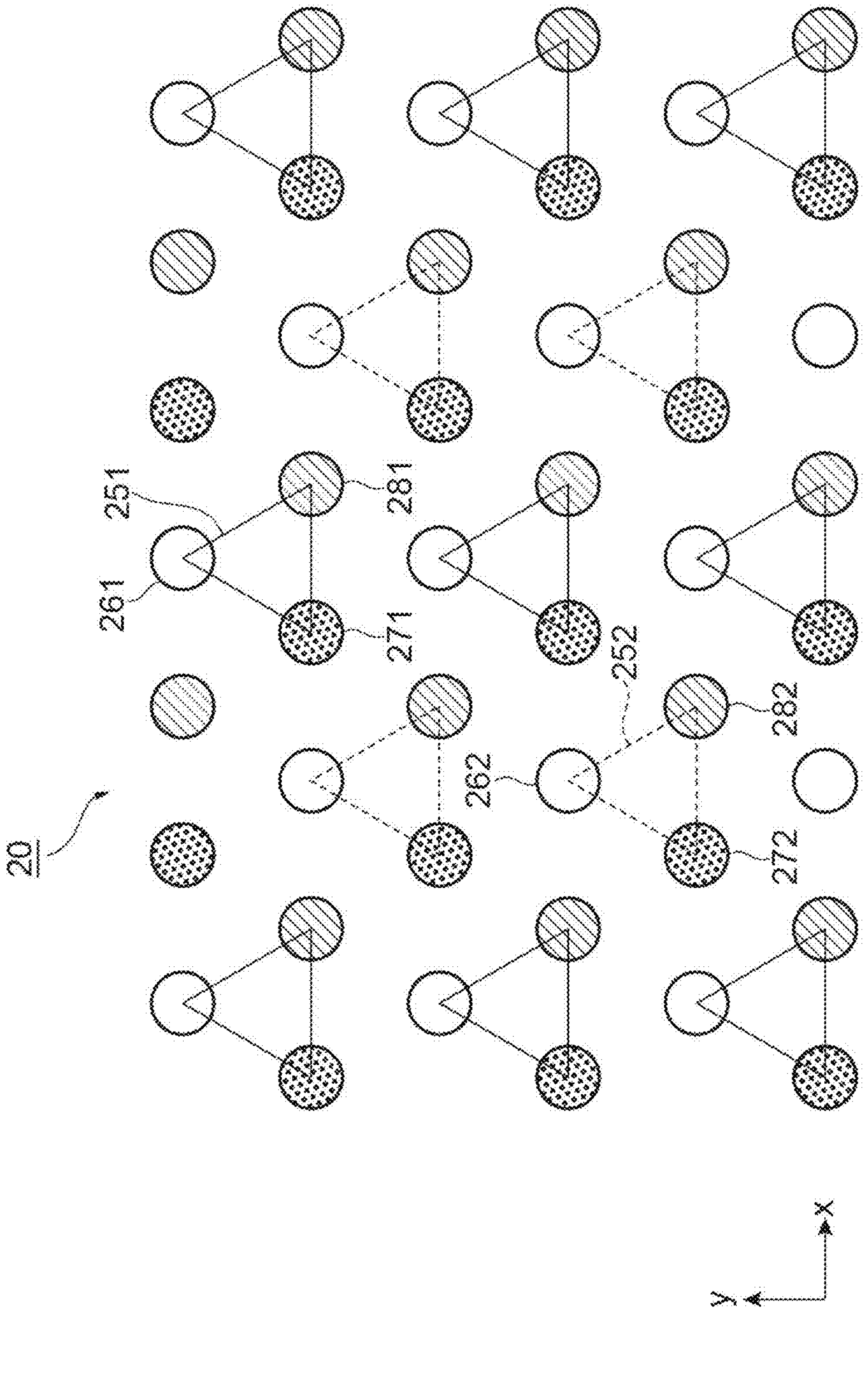
FIG. 6 is a diagram illustrating an arrangement of the plurality of structure elements in the structure element pattern.

As for the arrangement of the six types of structure elements described above in the first to third structure element patterns 21 to 23, the arrangement can be set to, for example, an arrangement as illustrated in FIG. 6. The structure element pattern 20 illustrated in FIG. 6 includes, as the plurality of unit patterns 25, a first unit pattern 251 illustrated by a solid line, and a second unit pattern 252 illustrated by a dashed line.

The first unit pattern 251 includes a structure element 261 used for focusing of the x direction linear polarization component Ln out of the first structure elements 26, a structure element 271 used for focusing of the +45° linear polarization component $L_{21}$ out of the second structure elements 27, and a structure element 281 used for focusing of the left-handed circular polarization component $L_{31}$ out of the third structure elements 28. The second unit pattern 252 includes a structure element 262 used for focusing of the y direction linear polarization component $L_{12}$ out of the first structure elements 26, a structure element 272 used for focusing of the −45° linear polarization component $L_{22}$ out of the second structure elements 27, and a structure element 282 used for focusing of the right-handed circular polarization component $L_{32}$ out of the third structure elements 28.

Further, as for the arrangement of the six types of structure elements described above, specifically, various configurations can be used in addition to the configuration illustrated in FIG. 6. In general, the structure element pattern 20 preferably includes, as the plurality of unit patterns 25, the first unit pattern including the structure element out of the first structure elements 26 used for focusing of one polarization component of the x direction linear polarization component Ln and the y direction linear polarization component $L_{12}$, the structure element out of the second structure elements 27 used for focusing of one polarization component of the +45° linear polarization component $L_{21}$ and the −45° linear polarization component $L_{22}$, and the structure element out of the third structure elements 28 used for focusing of one polarization component of the left-handed circular polarization component $L_{31}$ and the right-handed circular polarization component $L_{32}$, and the second unit pattern including the structure element out of the first structure elements 26 used for focusing of another polarization component of the x direction linear polarization component Lu and the y direction linear polarization component $L_{12}$, the structure element out of the second structure elements 27 used for focusing of another polarization component of the +45° linear polarization component $L_{21}$ and the −45° linear polarization component $L_{22}$, and the structure element out of the third structure elements 28 used for focusing of another polarization component of the left-handed circular polarization component $L_{31}$ and the right-handed circular polarization component $L_{32}$.

Figure 7:
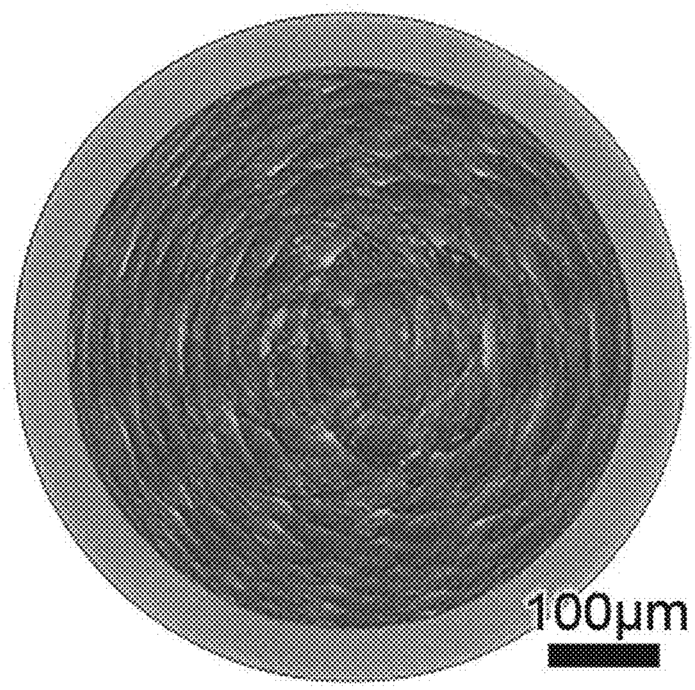
FIG. 7 is an optical microscope image showing an entire configuration of the polarization splitting device.
Figure 8:
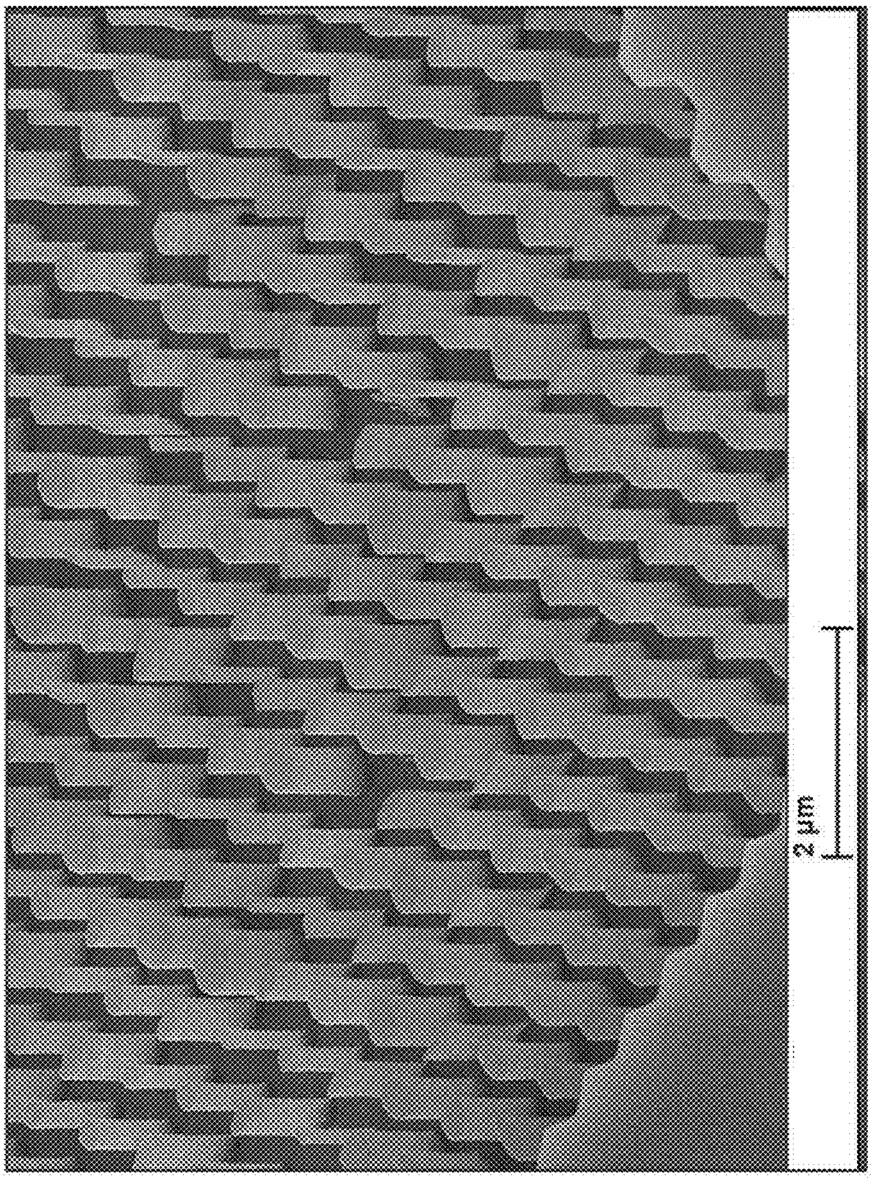
FIG. 8 is an electron microscope image showing a partially enlarged view of a configuration of the structure element pattern in the polarization splitting device.

FIG. 7 is an optical microscope image showing an entire configuration of a specific configuration example of the polarization splitting device 10. Further, FIG. 8 is an electron microscope image showing a partially enlarged view of a configuration of the structure element pattern 20 in the polarization splitting device 10. The polarization splitting device 10 in this case is formed in a circular shape having a diameter of 500 μm. In addition, the details of the specific structure, material, and the like of the configuration example of the polarization splitting device shown in FIG. 7 and FIG. 8 will be described later.

Effects of the polarization splitting device 10 according to the above embodiment and the optical receiver apparatus 1A using the polarization splitting device 10 will be described.

In the polarization splitting device 10 illustrated in FIG. 2 and FIG. 4, the structure element pattern 20 including the plurality of structure elements is formed in the polarization splitting layer 15 on the substrate 11, and by using the above structure element pattern 20, the first to sixth polarization components included in the object light $L_0$ which is incident from the lower surface 13 side of the substrate 11 are split and focused respectively on the first to sixth focal positions different from each other set on the focal plane 35. Further, the structure element pattern 20 on the substrate 11 is constituted by the first structure element pattern 21 for splitting and focusing the first polarization component and the second polarization component, the second structure element pattern 22 for splitting and focusing the third polarization component and the fourth polarization component, and the third structure element pattern 23 for splitting and focusing the fifth polarization component and the sixth polarization component.

In addition, in the configuration described above, as for the arrangement of the plurality of structure elements on the upper surface 12 of the substrate 11, the pattern constituted by the three structure elements of the first structure element 26, the second structure element 27, and the third structure element 28 is defined as the unit pattern 25, and further, the plurality of unit patterns 25 are arranged two-dimensionally with the predetermined arrangement pattern on the substrate 11. According to the above configuration, as illustrated in FIG. 4, the first to third structure elements 26 to 28 are uniformly distributed and arranged on the substrate 11, and it is possible to perform splitting and focusing of the first to sixth polarization components of the object light $L_0$ which is incident on the polarization splitting device 10 with good symmetry and by a simple configuration.

Further, the optical receiver apparatus 1A illustrated in FIG. 2 has the configuration including the polarization splitting device 10 of the above configuration, and the photodetection unit 30 for detecting respectively the first to sixth polarization components of the object light $L_0$ respectively focused at the first to sixth focal positions on the focal plane 35. According to the above configuration, it is possible to suitably detect the light intensity of each of the polarization components of the object light $L_0$ which are split and focused by the polarization splitting device 10 in the photodetection unit 30.

In the polarization splitting device 10 of the above configuration, as described above, the size and the height of each of the plurality of structure elements constituting the structure element pattern 20 and the arrangement distance of the structure elements are preferably respectively set to be less than the wavelength of the object light $L_0$. According to the above configuration, the subwavelength metasurface structure for splitting and focusing the polarization components of the object light $L_0$ can be suitably realized by using the structure element pattern 20 including the plurality of structure elements provided on the substrate 11.

As for the material of the plurality of structure elements in the polarization splitting layer 15, the material having the refractive index higher than that of the substrate 11 is used as described above, and further, specifically, the refractive index difference between the material of the substrate 11 and the material of the plurality of structure elements of the polarization splitting layer 15 is preferably set to 0.25 or more. According to the above configuration, splitting and focusing of the polarization components of the object light $L_0$ by using the structure element pattern 20 including the plurality of structure elements can be suitably realized.

For the purpose of reference, as for the refractive index values of the materials described above with respect to the substrate 11 and the polarization splitting layer 15 for the light having the wavelength of 1.55 μm, for the substrate 11, the refractive index values are 1.44 for quartz ($SiO_2$), 1.50 for BK7, 1.75 for $Al_2O_3$, 1.36 for $MgF_2$, 1.42 for $CaF_2$, and 1.38 for LiF.

Further, for the polarization splitting layer 15, the refractive index values are 3.478 for Si, 3.374 for GaAs, 3.167 for InP, 2.3 for GaN, 2.4 for $TiO_2$, 2.09 for $Ta_2O_5$, 2.17 for $Nb_2O_5$, 1.82 for $HfO_2$, 2.07 for $ZrO_2$, 1.90 for $Y_2O_3$, 1.7 for $Gd_2O_3$, 1.7 for $CeO_2$, 1.75 for $Al_2O_3$, and 1.989 for $Si_3N_4$.

The specific configuration of the structure element pattern 20 in the polarization splitting device 10, a method of designing the structure element (the elliptical post) constituting the structure element pattern 20, and the like will be described. The polarization splitting device 10 including the substrate 11 and the polarization splitting layer 15 may be manufactured, for example, by using a silicon on quartz (SOQ) substrate in which a silicon (Si) layer is formed on a quartz ($SiO_2$) substrate, and forming the Si layer into a metasurface structure by a microfabrication technique. Further, in the following description, it is assumed that the structure element constituting the structure element pattern 20 is the elliptical post.

The first structure element pattern 21 is designed such that the transmission phase distribution $\phi(x, y)$ of the light by the first structure element pattern 21 focuses the x direction linear polarization component Lu and the y direction linear polarization component $L_{12}$ at the first focal position and the second focal position. That is, the first structure element pattern 21 is designed to operate as a polarization splitting and focusing lens with the $S_1$ axis of the Poincare sphere as the basis.

The second structure element pattern 22 is designed such that the transmission phase distribution $\phi(x, y)$ of the light by the second structure element pattern 22 focuses the +45° linear polarization component $L_{21}$ and the −45° linear polarization component $L_{22}$ at the third focal position and the fourth focal position. The above phase distribution by the second structure element pattern 22 is obtained, for example, by rotating the phase distribution of the first structure element pattern 21 described above by 45° from the x axis.

The third structure element pattern 23 is designed such that the transmission phase distribution $\phi(x, y)$ of the light by the third structure element pattern 23 focuses the left-handed circular polarization component $L_{31}$ and the right-handed circular polarization component $L_{32}$ at the fifth focal position and the sixth focal position. The above phase distribution by the third structure element pattern 23 is obtained, for example, by creating a structure in which the phase difference between the x direction and the y direction is set to $\pi$, and inclining the structure by an angle $\theta$ with respect to the x axis.

Figure 9:
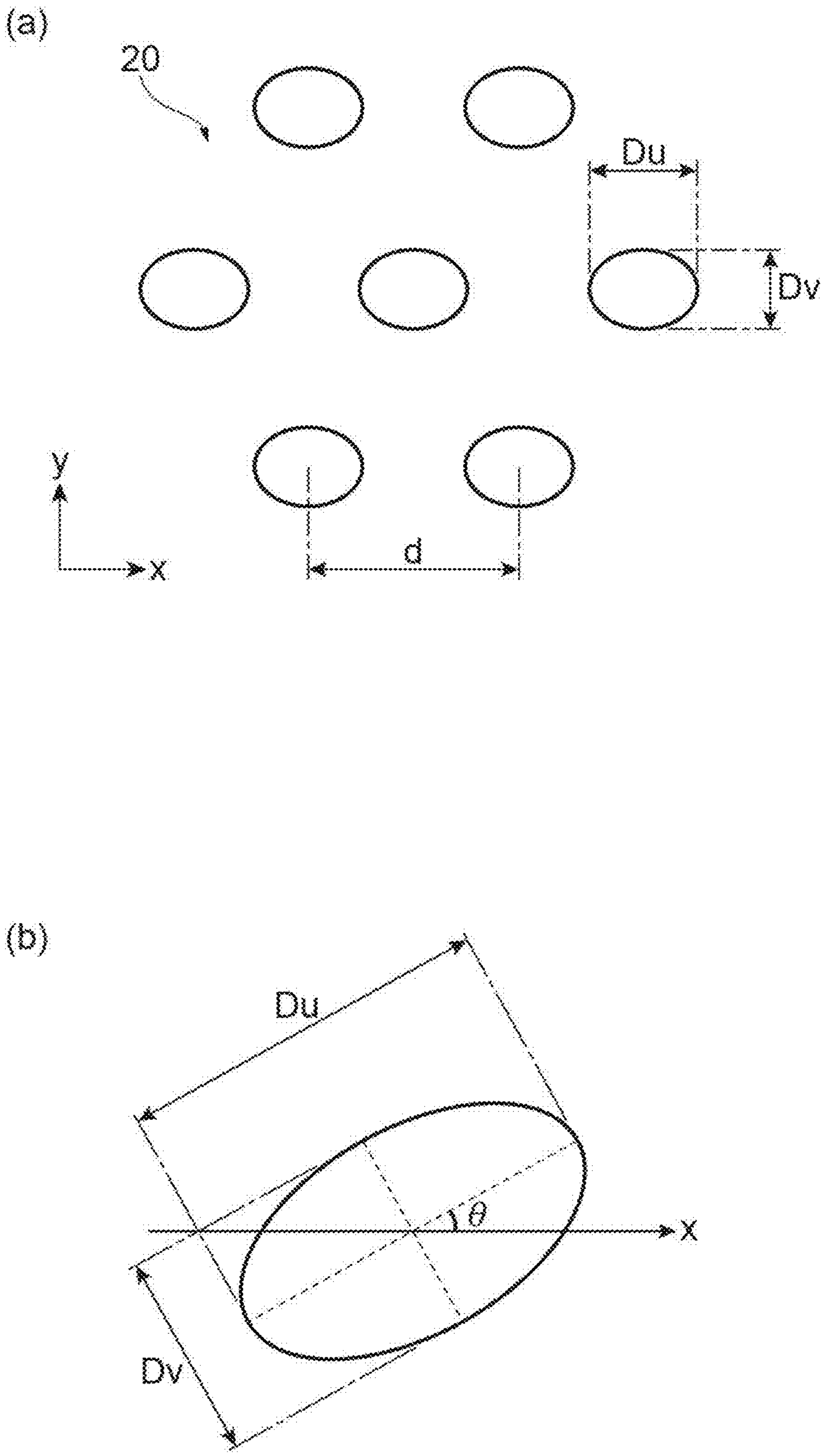
FIG. 9 includes (a), (b) diagrams illustrating setting of a shape of each of the structure elements in the structure element pattern.
Figure 10:
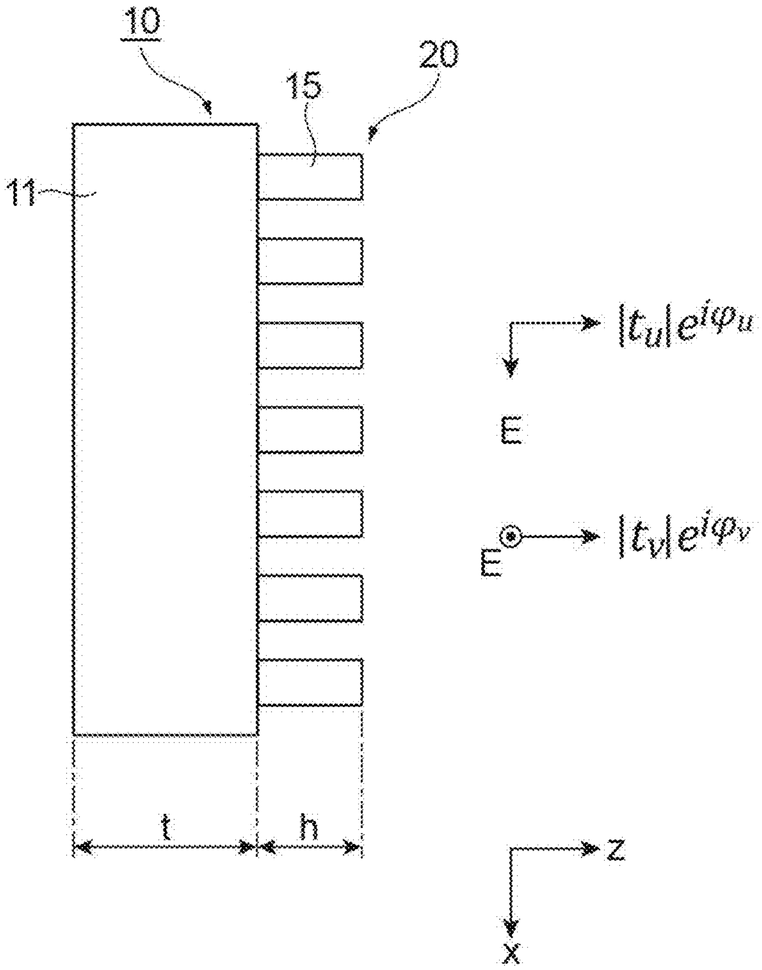
FIG. 10 is a diagram illustrating the setting of the shape of each of the structure elements in the structure element pattern.

FIG. 9 and FIG. 10 includes diagrams illustrating the setting of the shape of each of the structure elements in the structure element pattern 20. As illustrated in (a) and (b) in FIG. 9, the shape of the elliptical post of the structure element is determined by $D_u$ indicating a length of the ellipse axis in the x direction, $D_v$ indicating a length of the ellipse axis in the y direction, and a rotation angle $\theta$ of the elliptical post from the x axis. Further, in (a) in FIG. 9, d indicates the arrangement distance of the elliptical posts, which are the structure elements. For example, in the case of the configuration of the hexagonal lattice arrangement as illustrated in FIG. 4, the arrangement distance d is fixed for all the elliptical posts.

Further, as illustrated in FIG. 10, with respect to the object light $L_0$ which is the object of the polarization splitting by the polarization splitting device 10, an equivalent amplitude of the light polarized in the x direction is set to $|t_u|$, a transmission phase thereof is set to $\phi_u$, an equivalent amplitude of the light polarized in the y direction is set to $|t_v|$, and a transmission phase thereof is set to $\phi_v$. Further, in FIG. 10, t indicates the thickness of the substrate 11, and h indicates the height of the polarization splitting layer 15 including the structure element pattern 20. In one example, the thickness of the $SiO_2$ substrate 11 is set to t=625 μm, the height of the Si polarization splitting layer 15 is set to h=1050 nm, and the arrangement distance of the elliptical posts is set to d=700 nm.

In the design of the plurality of structure elements constituting the structure element pattern 20, first, change amounts of the phases $\phi_u$ and $\phi_y$ obtained when the lengths $D_u$ and $D_v$ of the elliptical post described above are changed are obtained by using the rigorous coupled wave analysis (RCWA) which is an electromagnetic field calculation method. A specific calculation method is, for example, the same as that described in Non Patent Document 1.

Figure 11:
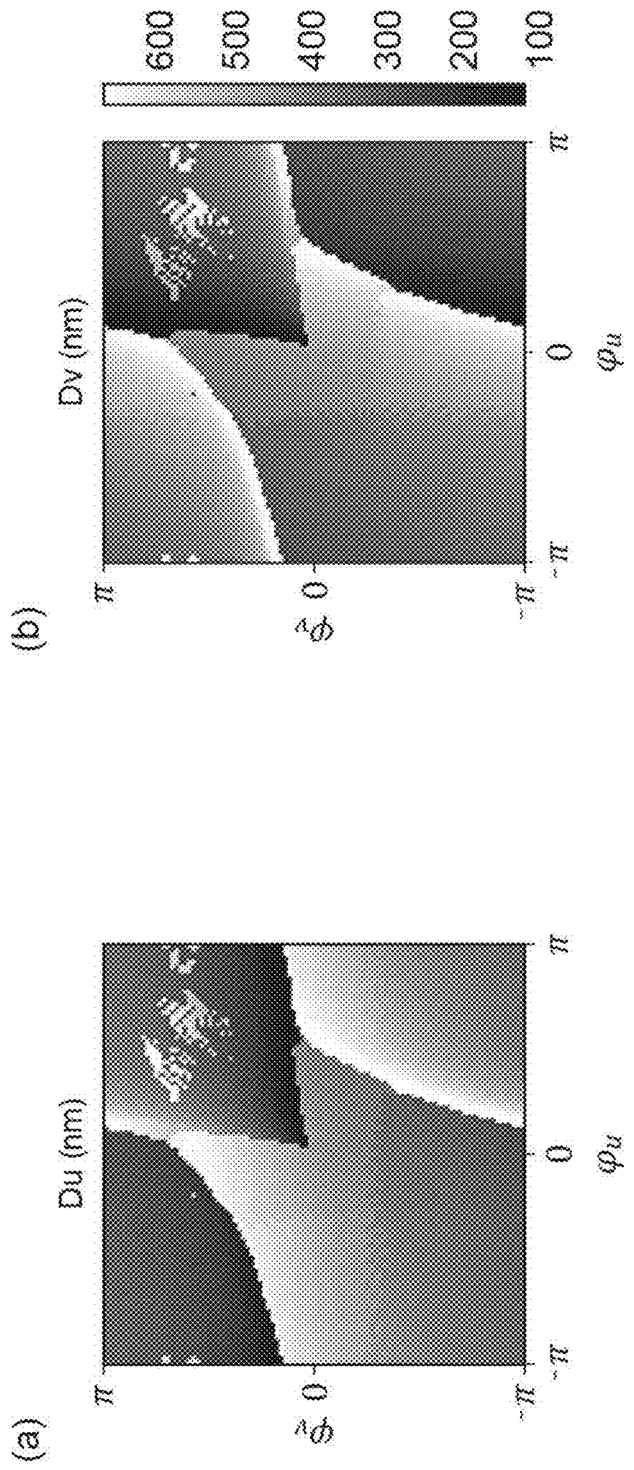
FIG. 11 includes (a), (b) diagrams each showing a relationship between a transmission phase of light in the structure element pattern, and a length of an elliptical post.

FIG. 11 includes diagrams each showing the relationship between the transmission phases $\phi_u$ and $\phi_v$ of the light in the structure element pattern 20, and the lengths $D_u$ and $D_v$ which are shape parameters of the elliptical post, and (a) in FIG. 11 shows the length $D_u$ corresponding to the respective values of the phases $\phi_u$ and $\phi_v$ and (b) in FIG. 11 shows the length $D_v$ corresponding to the respective values of the phases $\phi_u$ and $\phi_v$. In this case, the calculation is performed in the case in which the wavelength $\lambda$ of the object light $L_0$ is set to 1.55 μm, the arrangement distance (lattice constant) d of the elliptical posts in the structure element pattern 20 of the hexagonal lattice arrangement is set to 700 nm, and the rotation angle $\theta$ with respect to the x axis is set to 0°. By using the calculation results shown in (a) and (b) in FIG. 11, it is possible to obtain the lengths $D_u$ and $D_v$ of the elliptical post for obtaining the required transmission phases $\phi_u$ and $\phi_v$.

In the above description, the calculation is performed in the case in which the rotation angle of the elliptical post is set to $\theta=0°$, and further, as for the ±45° linear polarization components, the elliptical post described above may be rotated by ±45° from the x axis. Further, as for the left-handed circular polarization component, the required transmission phase is set to $\phi_L=\phi_u+2\theta$, and as for the right-handed circular polarization component, the required transmission phase is set to $\phi_R=\phi_u-2\theta$. Further, a necessary condition in this case is to determine $D_u$ and $D_v$ so as to satisfy the condition of $\phi_v=\phi_u+\pi$.

As for focusing of the respective polarization components of the object light $L_0$ by using the structure element pattern 20, in order to realize a function as a metalens for focusing the polarization component at the focal position on the focal plane 35, the metasurface structure in the first to third structure element patterns 21 to 23 is provided with a phase distribution represented by the following Formula (2).

[Formula 2]

$$\varphi(x, y) = -\frac{2\pi}{\lambda}\left(\sqrt{(x-x_0)^2+(y-y_0)^2+f^2}-f\right) \tag{2}$$

In this case, $(x_0, y_0)$ indicates the coordinate of the focal position of each of the polarization components on the focal plane 35, and f indicates the focal length.

Specifically, the focal length f is set to 2.5 mm (NA to 0.10), and the distance between the respective focal positions on the focal plane 35 (the distance between the vertices of the hexagon, see FIG. 3) is set to 50 μm. In this case, for example, the center position of the polarization splitting device 10 is set as the origin, and with the unit of μm, the center coordinate of the first structure element pattern 21 for focusing the x direction linear polarization component $L_{11}$ is set to (0, 50), and the center coordinate of the first structure element pattern 21 for focusing the y direction linear polarization component $L_{12}$ is set to (43.3, 25).

The center coordinate of the second structure element pattern 22 for focusing the +45° linear polarization component $L_{21}$ is set to (43.3, −25), and the center coordinate of the second structure element pattern 22 for focusing the −45° linear polarization component $L_{22}$ is set to (0, −50). The center coordinate of the third structure element pattern 23 for focusing the left-handed circular polarization component $L_{31}$ is set to (−43.3, −25), and the center coordinate of the third structure element pattern 23 for focusing the right-handed circular polarization component $L_{32}$ is set to (−43.3, 25).

Figure 12:
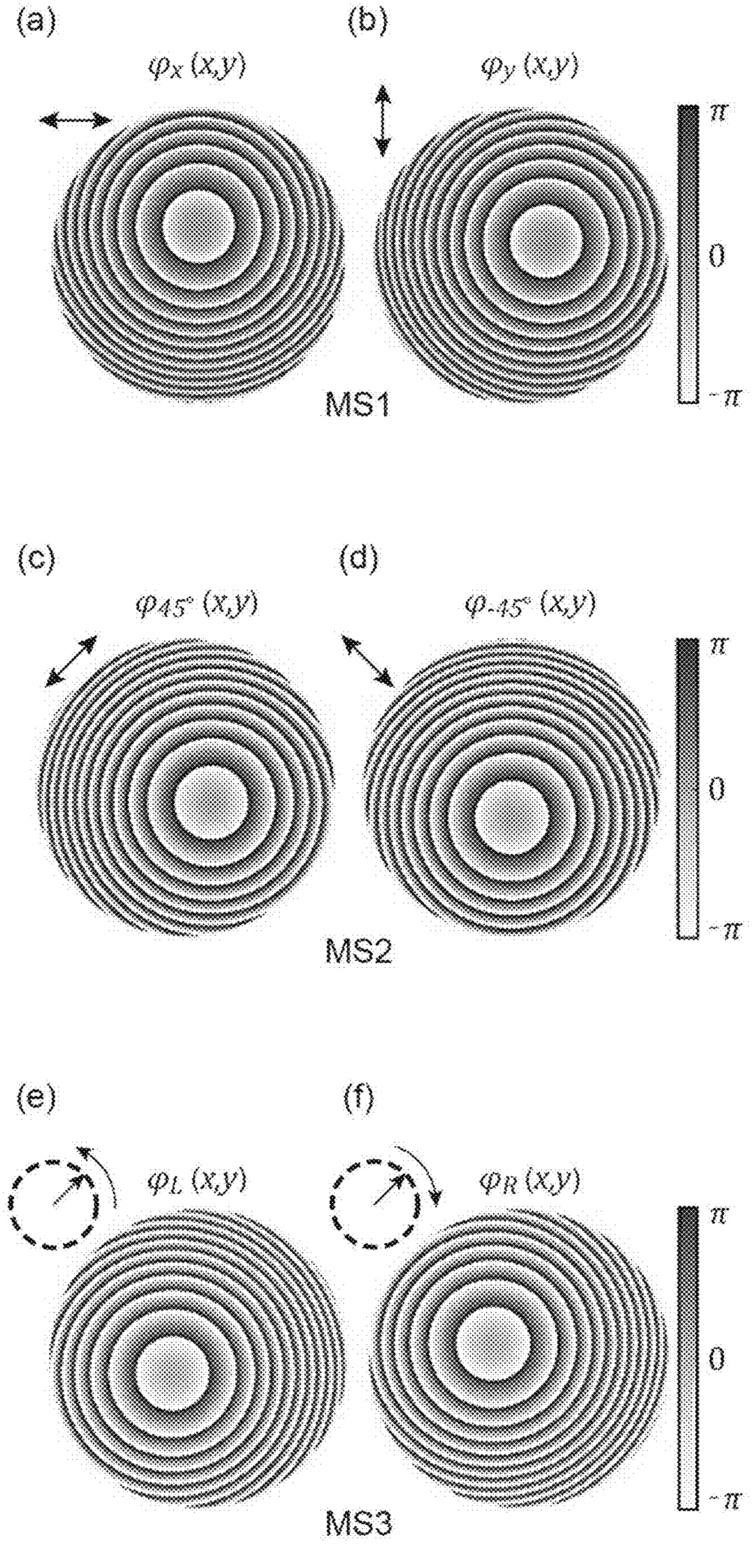
FIG. 12 includes (a)-(f) diagrams each showing a phase distribution corresponding to each of the polarization components in the structure element pattern.

FIG. 12 includes diagrams each showing the phase distribution corresponding to each of the polarization components (wavelength of 1.55 μm) in the structure element pattern 20. (a) and (b) in FIG. 12 show the phase distributions in the first structure element pattern 21 (MS1), (c) and (d) in FIG. 12 show the phase distributions in the second structure element pattern 22 (MS2), and (e) and (f) in FIG. 12 show the phase distributions in the third structure element pattern 23 (MS3). In addition, as for the shape and the size of the polarization splitting device 10, the polarization splitting device 10 has a circular shape with a diameter of ϕ500 μm, in consideration of coupling with the optical fiber. As described above, the configuration of the structure element pattern 20 including the plurality of structure elements in the polarization splitting device 10 can be determined.

An example of a method of manufacturing the polarization splitting device 10 according to the above embodiment will be briefly described. First, a SOQ substrate including a $SiO_2$ layer serving as the substrate 11 and a Si layer serving as the polarization splitting layer 15 is prepared, and the SOQ substrate is cleaned by using general organic cleaning. In this case, for example, ultrasonic cleaning of the SOQ substrate is performed in acetone, IPA, or ethanol. Further, in the SOQ substrate, the thickness t of the $SiO_2$ layer is set to, for example, 625 μm, and the height h of the Si layer is set to, for example, 1050 nm.

Subsequently, for the purpose of improving wettability and adhesion between the Si layer and a resist, a surface active agent (for example, Tokyo Ohka OAP) is applied, spin coating is performed with, for example, 3000 rpm and 30 sec, and then baking is performed at 120° C. for 1 minute. Further, an EB resist (for example, ZEP520A) is applied on the Si layer, and is made to be a thickness of about 200 nm by spin coating.

Thereafter, lithography and development are performed using an electron beam lithography apparatus, thereby forming a resist pattern having a metasurface structure corresponding to the structure element pattern 20. Next, dry etching of the Si layer is performed by using the resist pattern as a protective film, thereby forming the metasurface structure of the Si layer to be the structure element pattern 20. As a gas for dry etching, for example, $SF_6$, $C_4F_8$, Ar, or $O_2$ can be used. Thereafter, the EB resist used as a mask at the time of etching of the Si layer is removed by $O_2$ ashing, and thus, the polarization splitting device 10 having the above configuration can be manufactured.

Figure 13:
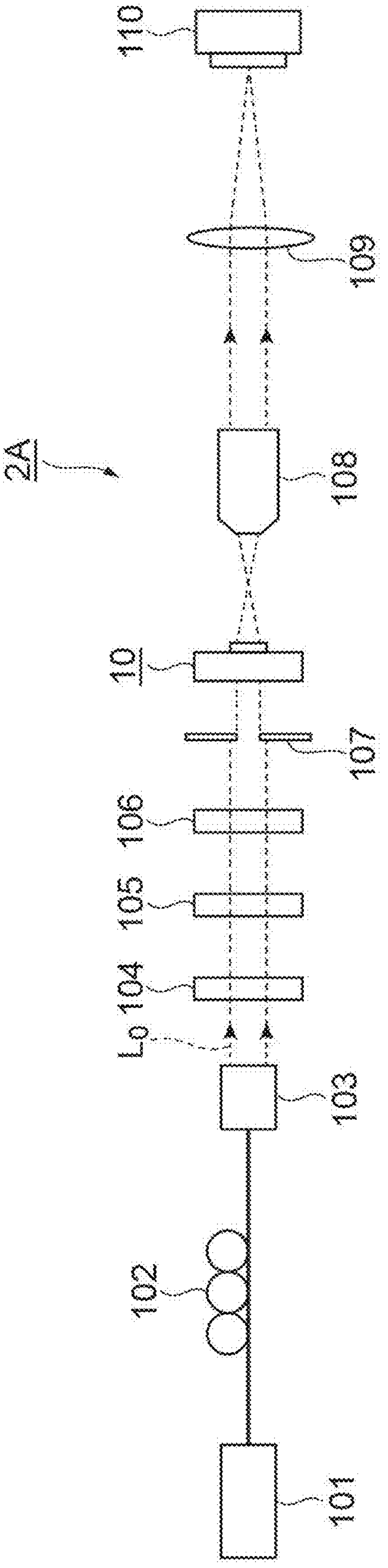
FIG. 13 is a diagram illustrating a configuration of a measurement system used for evaluating characteristics of the polarization splitting device.

The characteristics of the polarization splitting device 10 according to the configuration example described above will be described together with specific measurement data. FIG. 13 is a diagram illustrating a configuration of a measurement system 2A used for evaluating the characteristics of the polarization splitting device 10. The measurement system 2A illustrated in FIG. 13 includes a laser light source 101, a polarization controller 102, a fiber collimator 103, a polarizer 104, a half wave plate 105, a quarter wave plate 106, an iris 107, an objective lens 108, a tube lens 109, and an imaging device 110.

In the above measurement system 2A, the polarization splitting device 10 serving as an evaluation object is arranged between the iris 107 and the objective lens 108. As the laser light source 101, for example, a wavelength variable laser can be used. Further, as the imaging device 110, for example, an InGaAs camera (C12741-03 manufactured by Hamamatsu Photonics K.K., light receiving surface size: 12.8 mm (H)×10.24 mm (V)) can be used.

The object light $L_0$ having a wavelength of λ=1.55 μm output from the laser light source 101 reaches the polarization splitting device 10 through the polarization controller 102, the fiber collimator 103, the polarizer 104, the half wave plate 105, the quarter wave plate 106, and the iris 107. In this case, the object light $L_0$ can be set to a desired polarization state by rotating the polarizer 104, the half wave plate 105, and the quarter wave plate 106.

The respective polarization components which are split and focused by the polarization splitting device 10 is converted into parallel light by using the objective lens 108 having a magnification of 50 times, and an image is formed on a light receiving surface of the imaging device 110 by using the tube lens 109. The characteristics of the polarization splitting device 10 can be evaluated according to the light intensity of each of the polarization components in a two-dimensional image acquired by the imaging device 110.

Figure 14:
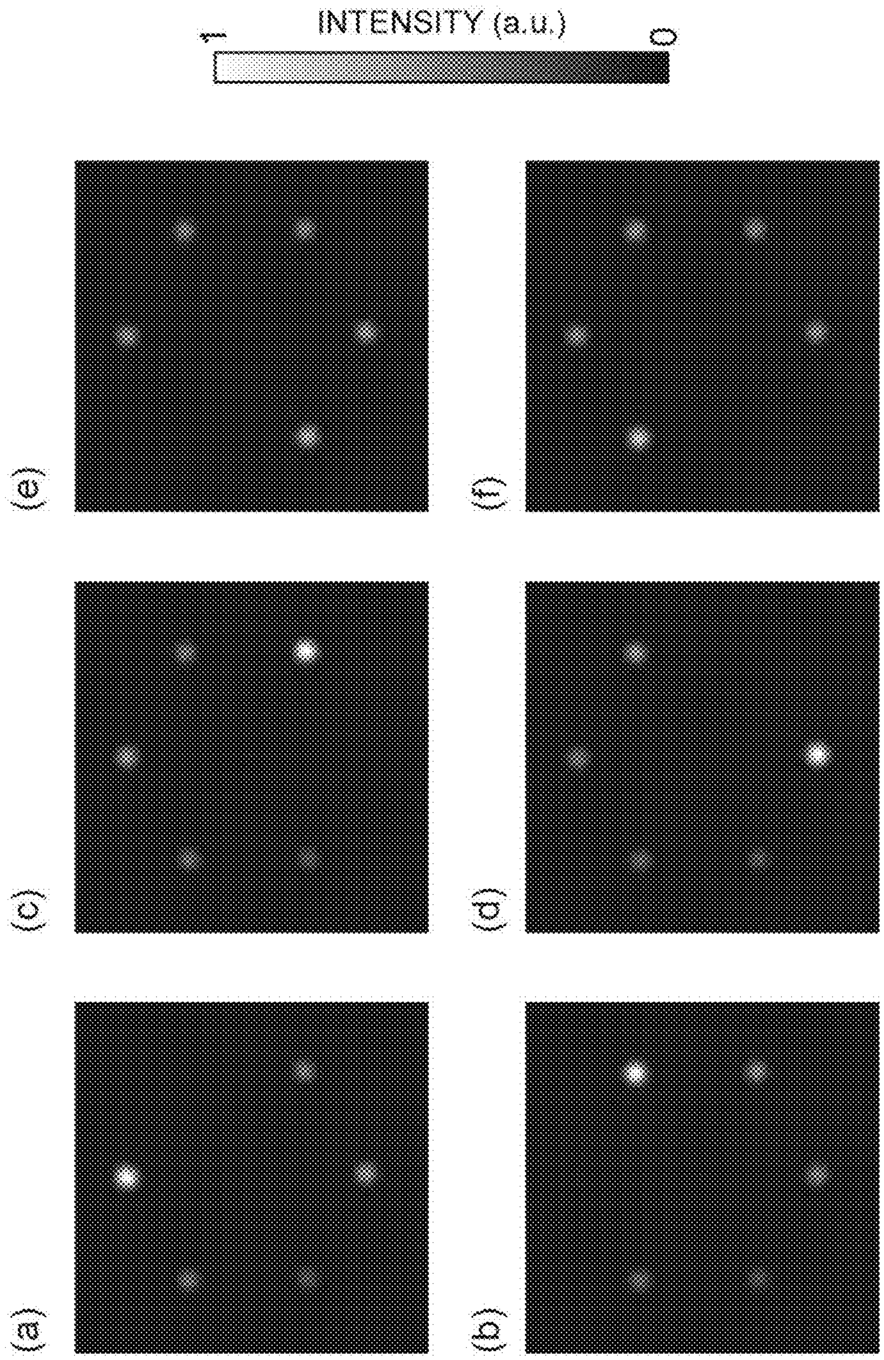
FIG. 14 includes (a)-(f) diagrams each showing an intensity distribution of object light acquired by an imaging device.

FIG. 14 includes diagrams each showing the intensity distribution of the object light $L_0$ acquired by the imaging device 110. (a) in FIG. 14 shows the measurement result in the case in which the Stokes vector ($S_1$, $S_2$, $S_3$) of the object light $L_0$ of the object of polarization splitting is set to (+1, 0, 0), (b) in FIG. 14 shows the measurement result in the case of (−1, 0, 0), (c) in FIG. 14 shows the measurement result in the case of (0, +1, 0), (d) in FIG. 14 shows the measurement result in the case of (0, −1, 0), (e) in FIG. 14 shows the measurement result in the case of (0, 0, +1), and (f) in FIG. 14 shows the measurement result in the case of (0, 0, −1).

Figure 15:
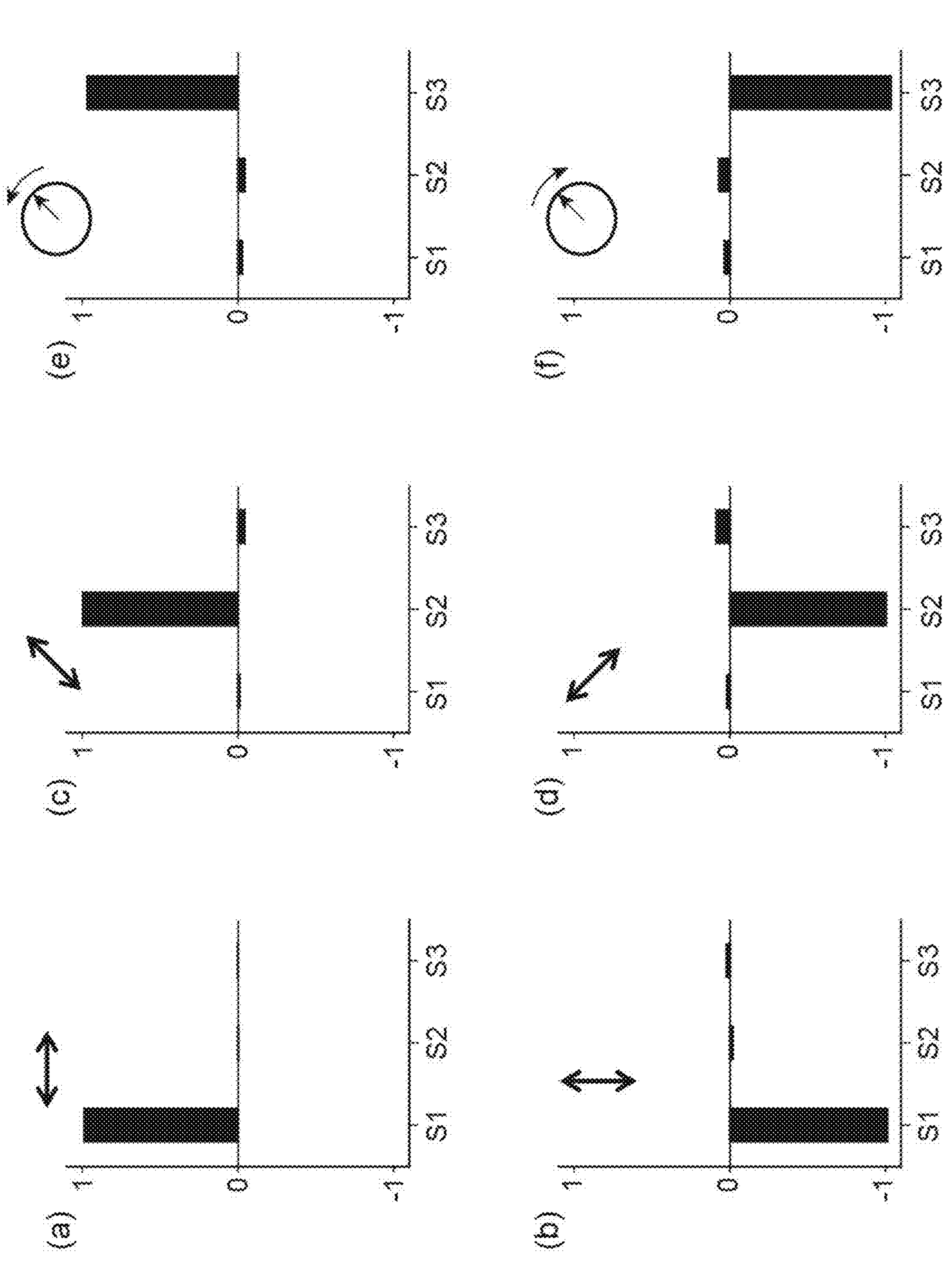
FIG. 15 includes (a)-(f) graphs each showing the Stokes parameters of the object light obtained from a measurement result shown in FIG. 14.

Further, (a) to (f) in FIG. 15 are graphs each showing the Stokes parameters $S_1$, $S_2$, and $S_3$ of the object light $L_0$ respectively obtained from the measurement results shown in (a) to (f) in FIG. 14. As shown in FIG. 14 and FIG. 15 described above, according to the polarization splitting device 10 of the above configuration, it is possible to appropriately split and focus the respective polarization components included in the object light $L_0$, and accurately measure the Stokes parameters thereof.

Figure 16:
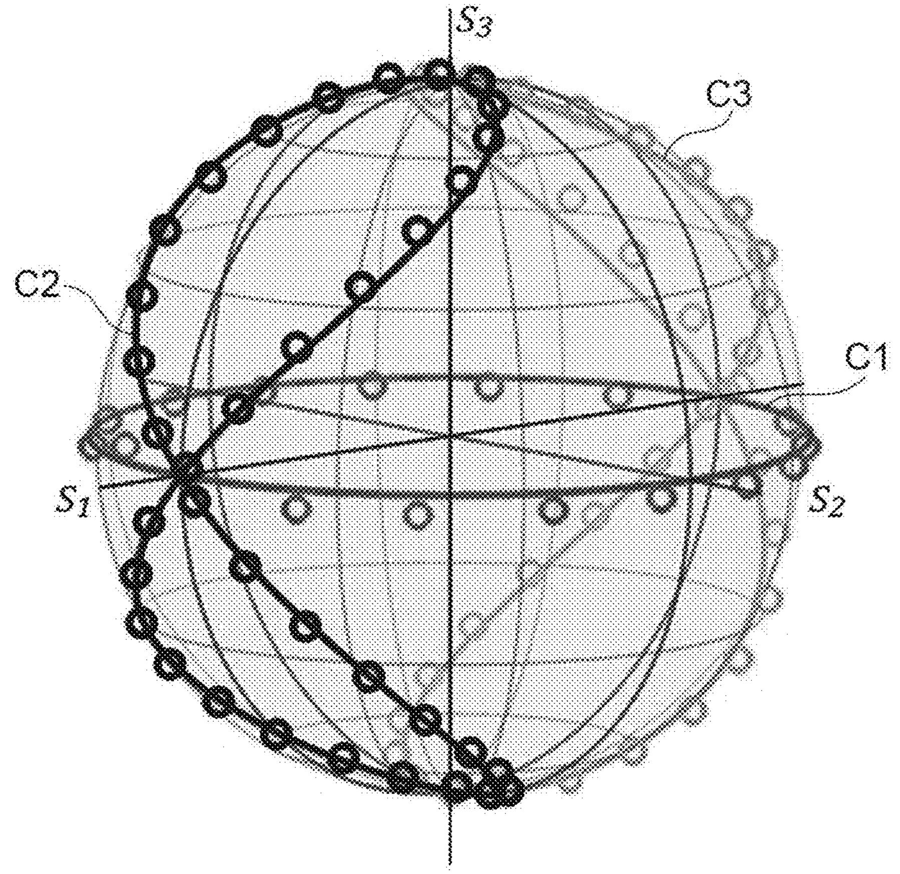
FIG. 16 is a diagram showing a Stokes vector reproduced from the intensity distribution of the object light acquired by the imaging device.

FIG. 16 is a diagram showing the Stokes vector reproduced from the intensity distribution of the object light $L_0$ acquired by the imaging device 110. In FIG. 16, a sphere shown in the Stokes space indicates the Poincare sphere, the data shown by using a solid line indicate the theoretically obtained polarization state, and the data shown by using plot points indicate the result of actually measuring the polarization state of the object light.

Further, in FIG. 16, the data C1 indicate the data in the case in which the half wave plate (HWP) 105 and the quarter wave plate (QWP) 106 are rotated while maintaining the relationship of $\theta_{QWP}=2\,\theta_{HWP}$, the data C2 indicate the data in the case in which the half wave plate 105 is fixed at $\theta_{HWP}=0°$ and $\theta_{QWP}$ of the quarter wave plate 106 is rotated, and the data C3 indicate the date in the case in which the half wave plate 105 is fixed at $\theta_{HWP}=45°$ and $\theta_{QWP}$ of the quarter wave plate 106 is rotated. As shown in the data C1 to C3 described above, the theoretically obtained polarization state and the polarization state of the measurement result are in good agreement with each other.

The configuration examples of the structure element pattern 20 in addition to the configuration example illustrated in FIG. 4 and FIG. 5 will be described. In the above embodiment, for the structure element pattern 20, the unit pattern 25 is set to the pattern of the equilateral triangular shape, and the structure element pattern 20 is set to the pattern with the hexagonal lattice arrangement. As for the structure element pattern 20 used for splitting and focusing of the respective polarization components of the object light $L_0$, specifically, various configurations can be used in addition to the configuration described above. In addition, in FIG. 17 to FIG. 19 described below, each of the structure elements is illustrated by a circular shape, and an arrangement pattern of the plurality of structure elements is schematically illustrated.

Figure 17:
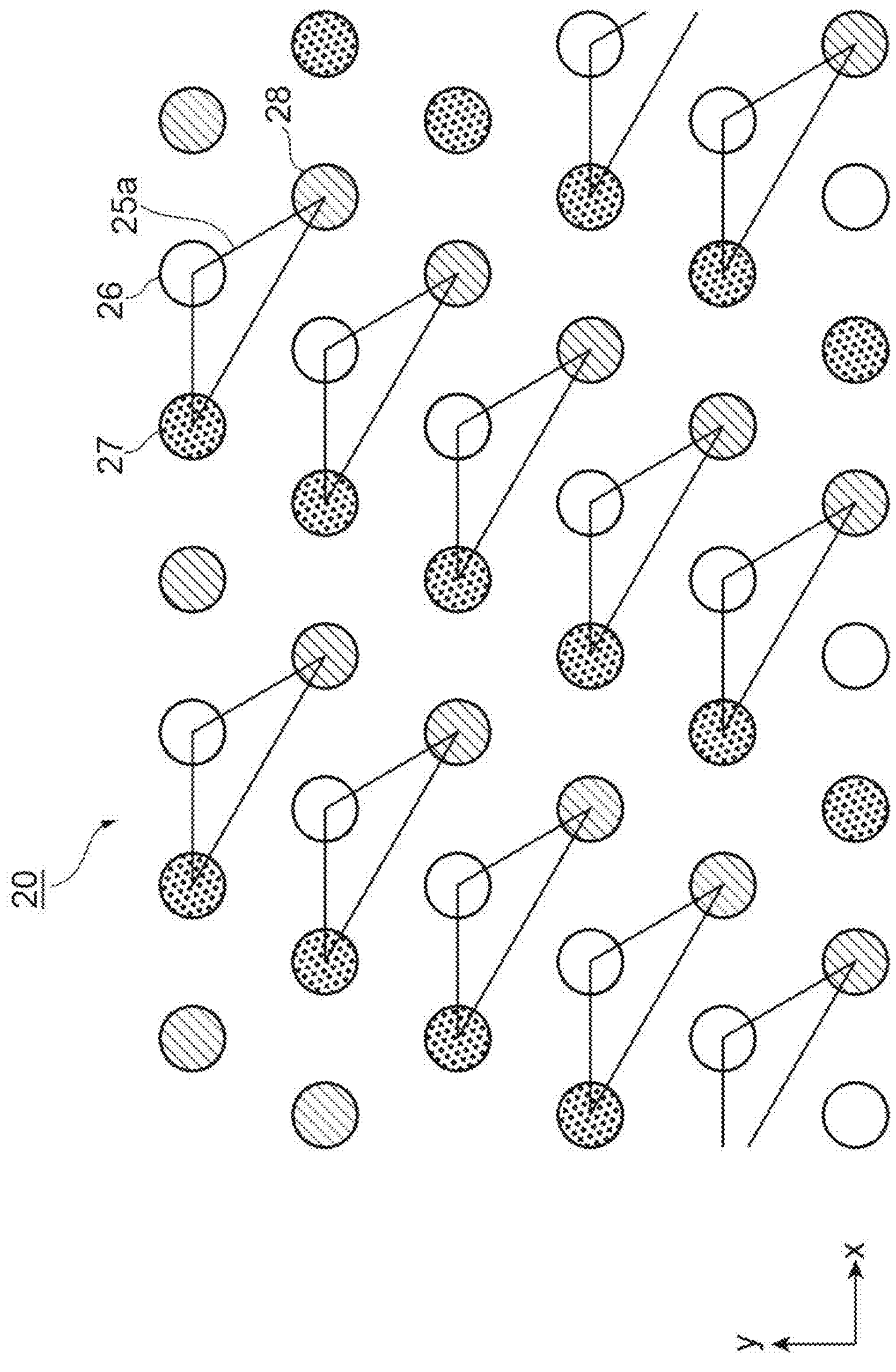
FIG. 17 is a diagram illustrating a modification of the configuration of the structure element pattern in the polarization splitting device.

FIG. 17 is a diagram illustrating the configuration of the structure element pattern 20 in the polarization splitting device 10 according to a first modification. In the configuration illustrated in FIG. 17, a unit pattern 25*a* is set to a pattern of an isosceles triangular shape constituted by the first structure element 26, the second structure element 27, and the third structure element 28. Further, as for the entire configuration of the structure element pattern 20 including the plurality of unit patterns 25*a*, the structure element pattern 20 is set to a pattern with a hexagonal lattice arrangement, as in the configuration illustrated in FIG. 5.

Figure 18:
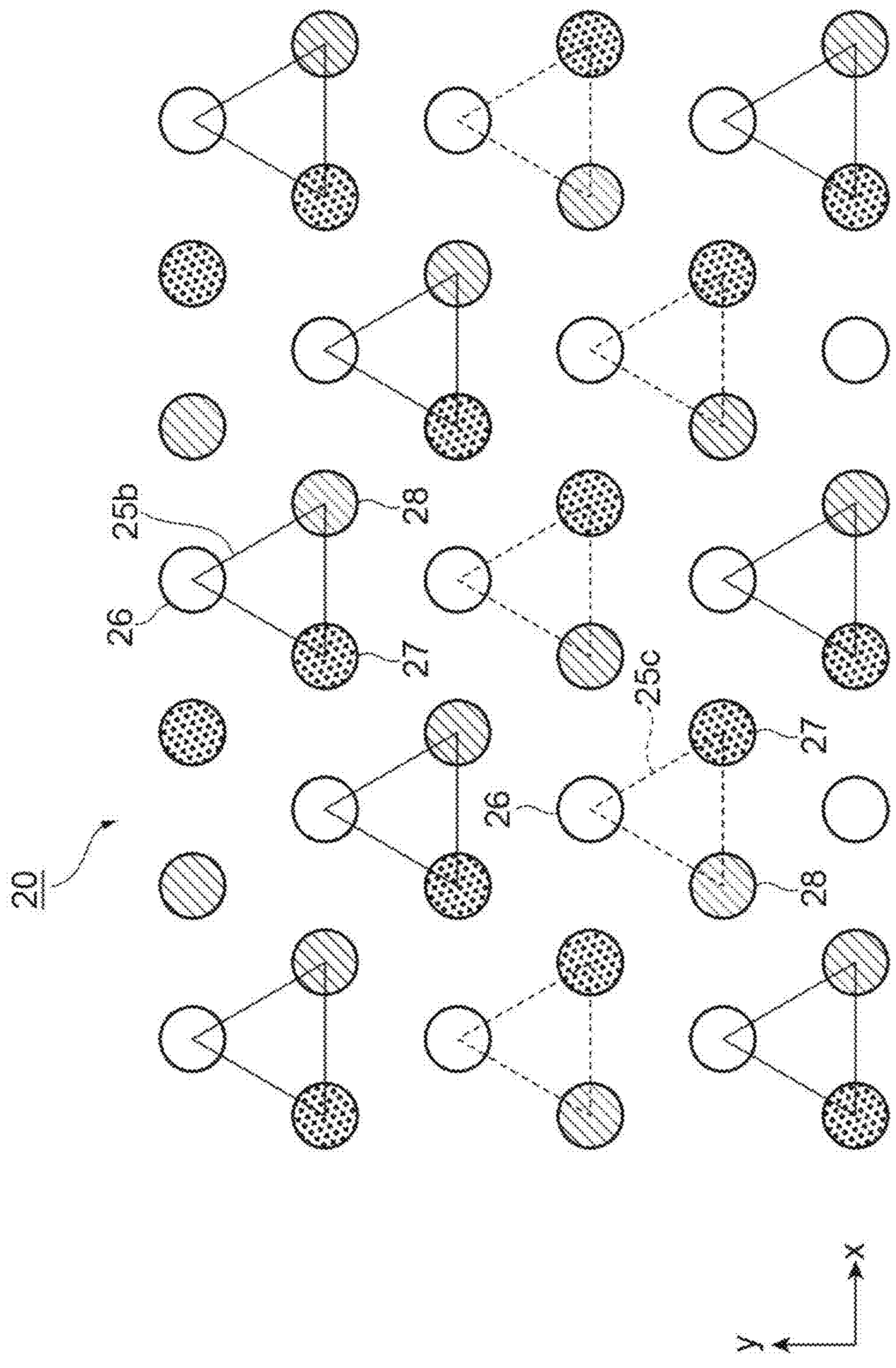
FIG. 18 is a diagram illustrating a modification of the configuration of the structure element pattern in the polarization splitting device.

FIG. 18 is a diagram illustrating the configuration of the structure element pattern 20 in the polarization splitting device 10 according to a second modification. In the configuration illustrated in FIG. 18, as the plurality of unit patterns, a plurality of types (two types in the example illustrated in FIG. 18) of unit patterns 25*b* and 25*c* in which the arrangements of the first structure element 26, the second structure element 27, and the third structure element 28 are different from each other are included. Each of the unit patterns 25*b* and 25*c* is set to a pattern of an equilateral triangular shape.

In the unit pattern 25*b*, similarly to the unit pattern 25 illustrated in FIG. 4, the first structure element 26 is arranged at the upper vertex of the equilateral triangular shape pattern, the second structure element 27 is arranged at the lower left vertex, and the third structure element 28 is arranged at the lower right vertex. On the other hand, in the unit pattern 25*c*, the first structure element 26 is arranged at the upper vertex of the equilateral triangular shape pattern, the third structure element 28 is arranged at the lower left vertex, and the second structure element 27 is arranged at the lower right vertex, so that the arrangement of the second structure element 27 and the third structure element 28 is reversed from that in the unit pattern 25*b*.

In addition, in the configuration in which the plurality of types of unit patterns are provided as the plurality of unit patterns in the structure element pattern 20, in general, it is preferable to use unit patterns in which the arrangement orders, the pattern shapes, or the like of the first structure element 26, the second structure element 27, and the third structure element 28 are different from each other. Further, the number of types of unit patterns is set to two in the above configuration, and in addition, the number of types may be set to three or more.

Figure 19:
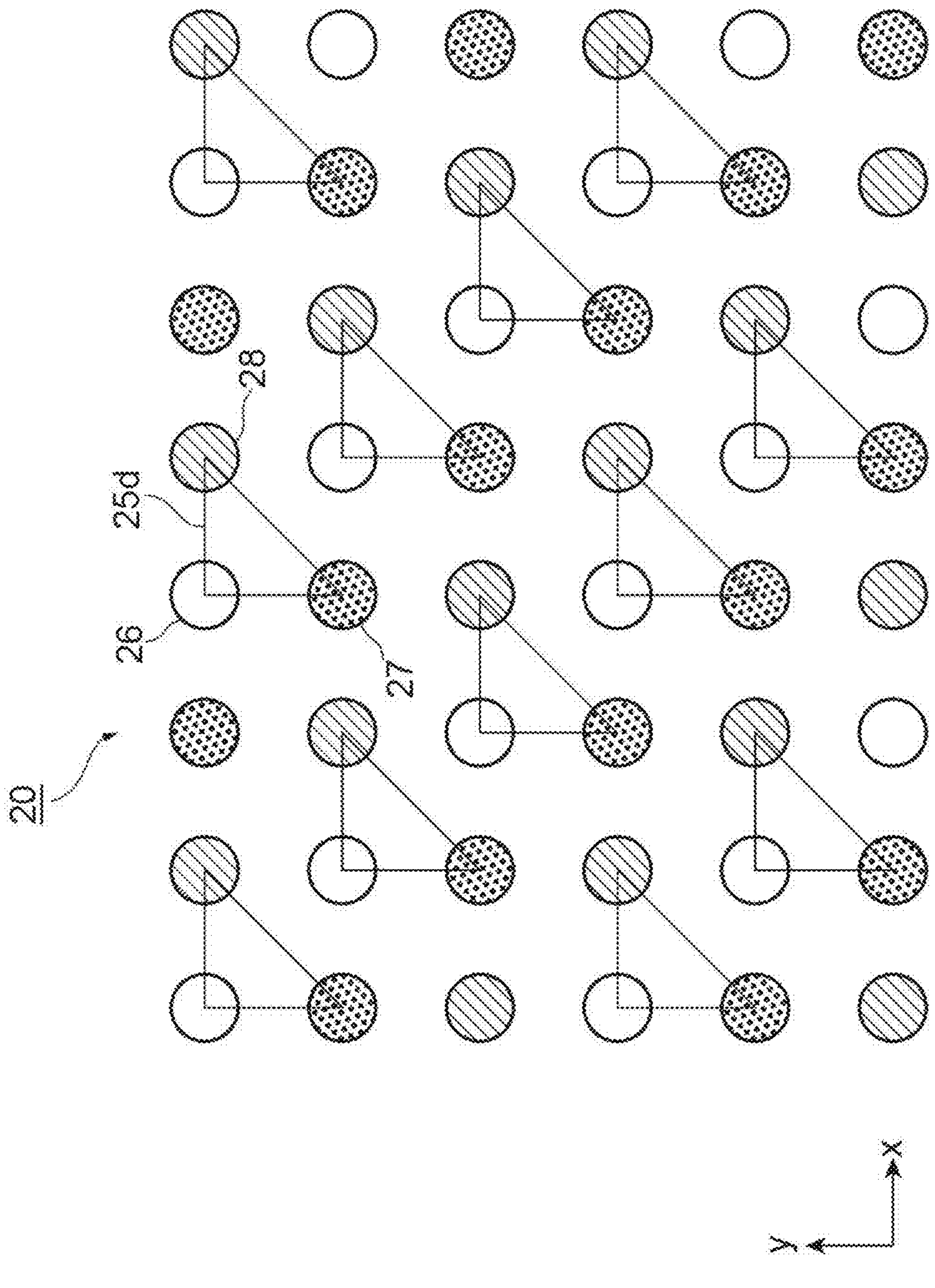
FIG. 19 is a diagram illustrating a modification of the configuration of the structure element pattern in the polarization splitting device.

FIG. 19 is a diagram illustrating the configuration of the structure element pattern 20 in the polarization splitting device 10 according to a third modification. In the configuration illustrated in FIG. 19, a unit pattern 25*d* is set to a pattern of an isosceles right triangular shape constituted by the first structure element 26, the second structure element 27, and the third structure element 28. Further, as for the entire configuration of the structure element pattern 20 including the plurality of unit patterns 25*d*, the structure element pattern 20 is set to a pattern with a square lattice arrangement, which is different from the configuration illustrated in FIG. 5.

As described above, as for the structure element pattern 20 in the polarization splitting layer 15 which is formed on the substrate 11, specifically, various pattern configurations can be used. In addition, as for the entire configuration of the structure element pattern 20, the structure element pattern 20 is set to the pattern with the hexagonal lattice arrangement in each of the configurations illustrated in FIG. 5, FIG. 17, and FIG. 18, and is set to the pattern with the square lattice arrangement in the configuration illustrated in FIG. 19. As for the above patterns, in the pattern of the square lattice arrangement illustrated in FIG. 19, the arrangement distance between the second structure element 27 and the third structure element 28 is longer than the arrangement distance between the first structure element 26 and the second structure element 27 or the third structure element 28. In consideration of the above point, as for the entire configuration of the structure element pattern 20, it is more preferable to set the structure element pattern 20 to the pattern of the hexagonal lattice arrangement in which all the arrangement distances between the structure elements are equal to each other.

The polarization splitting device and the optical receiver apparatus are not limited to the embodiments and configuration examples described above, and various modifications are possible. For example, as for the first to sixth polarization components of the object light serving as the object of splitting and focusing by the polarization splitting device, in the above embodiment, the polarization components are set to the x direction linear polarization component, the y direction linear polarization component, the +45° linear polarization component, the −45° linear polarization component, the left-handed circular polarization component, and the right-handed circular polarization component, and in addition, the setting of the polarization components is not limited to the above configuration, and specifically, various combinations of the polarization components may be used. Further, as for the shape of the structure element having the two-fold rotational symmetry and constituting the structure element pattern, the structure element is not limited to the elliptical post described above, and specifically, structure elements having various shapes may be used.

Further, as for the configuration of the polarization splitting device of the transmission type, in the above embodiment, the lower surface of the substrate is set as the light incident surface, and the upper surface of the polarization splitting layer is set as the light output surface, and in addition, the configuration is not limited to the above configuration, and the upper surface of the polarization splitting layer may be set as the light incident surface, and the lower surface of the substrate may be set as the light output surface. In general, the polarization splitting device may have the configuration of the transmission type in which one surface of the lower surface of the substrate and the upper surface of the polarization splitting layer is set as the light incident surface, and the other surface is set as the light output surface, and further, the polarization splitting layer may split the first to sixth polarization components included in the object light incident from the light incident surface side, and may focus the first to sixth polarization components respectively at the first to sixth focal positions different from each other on the focal plane set on the light output surface side. Further, in the configuration in which the lower surface of the substrate is set as the light output surface, for example, it is possible to use the configuration in which a photodetector such as a photodiode serving as the photodetection unit is directly attached to the lower surface of the substrate.

Further, in the optical receiver apparatus including the polarization splitting device, as for the configuration of the photodetection unit for detecting the respective polarization components of the object light, in the above embodiment, the configuration in which the first to sixth photodetectors for respectively detecting the first to sixth polarization components are provided is used, and in addition, the configuration is not limited to the above configuration, and for example, as illustrated in the evaluation measurement system of FIG. 13, the configuration in which the single imaging device is used as the photodetection unit may be used. As the above imaging device, for example, a CCD camera, a CMOS camera, or the like can be used.

The polarization splitting device according to the above embodiment includes (1) a substrate having a transmitting property for object light; and (2) a polarization splitting layer made of a material having a transmitting property for the object light and with a refractive index higher than that of the substrate, having a structure element pattern including a plurality of structure elements each having two-fold rotational symmetry, and formed on an upper surface of the substrate, and the polarization splitting device has a configuration of a transmission type in which one surface of a lower surface of the substrate and an upper surface of the polarization splitting layer is set as a light incident surface, and another surface is set as a light output surface, (3) the polarization splitting layer splits first to sixth polarization components included in the object light incident from the light incident surface side, and focuses the first to sixth polarization components respectively at first to sixth focal positions different from each other on a focal plane set on the light output surface side, and (4) the structure element pattern includes a first structure element pattern including a plurality of first structure elements, and for focusing the first polarization component and the second polarization component respectively at the first focal position and the second focal position; a second structure element pattern including a plurality of second structure elements, and for focusing the third polarization component and the fourth polarization component respectively at the third focal position and the fourth focal position; and a third structure element pattern including a plurality of third structure elements, and for focusing the fifth polarization component and the sixth polarization component respectively at the fifth focal position and the sixth focal position, and a pattern of a linear shape or a triangular shape constituted by the first structure element, the second structure element, and the third structure element is set as a unit pattern, and a plurality of unit patterns are two-dimensionally arranged on the upper surface of the substrate.

In the above polarization splitting device, a size of each of the plurality of structure elements constituting the structure element pattern on the upper surface of the substrate, and a height of each of the plurality of structure elements from the upper surface of the substrate may be respectively set to be less than a wavelength of the object light. Further, an arrangement distance of the plurality of structure elements in the structure element pattern may be set to be less than a wavelength of the object light. According to the above configuration, the subwavelength metasurface structure for splitting and focusing the polarization components of the object light can be suitably constituted by using the structure element pattern including the plurality of structure elements. Further, as for the structure element having the two-fold rotational symmetry in the structure element pattern, specifically, for example, an elliptical post may be used.

In the above polarization splitting device, as for the first to sixth polarization components of the object light, specifically, the first to sixth polarization components may be respectively set to an x direction linear polarization component, a y direction linear polarization component, a +45° linear polarization component, a −45° linear polarization component, a left-handed circular polarization component, and a right-handed circular polarization component. According to the above configuration, for example, the Stokes parameters of the object light can be suitably obtained by detecting each of the polarization components which are split and focused as described above.

In the above polarization splitting device, as for the specific configuration of the unit pattern and the structure element pattern in the polarization splitting layer, the unit pattern may be a pattern of an equilateral triangular shape, and the structure element pattern may be set to a pattern with a hexagonal lattice arrangement. Further, the unit pattern may be a pattern of an isosceles right triangular shape, and the structure element pattern may be set to a pattern with a square lattice arrangement.

Further, the structure element pattern may include, as the plurality of unit patterns, a first unit pattern including a structure element out of the first structure elements used for focusing of one polarization component of the first polarization component and the second polarization component, a structure element out of the second structure elements used for focusing of one polarization component of the third polarization component and the fourth polarization component, and a structure element out of the third structure elements used for focusing of one polarization component of the fifth polarization component and the sixth polarization component; and a second unit pattern including a structure element out of the first structure elements used for focusing of another polarization component of the first polarization component and the second polarization component, a structure element out of the second structure elements used for focusing of another polarization component of the third polarization component and the fourth polarization component, and a structure element out of the third structure elements used for focusing of another polarization component of the fifth polarization component and the sixth polarization component.

Further, the structure element pattern may include, as the plurality of unit patterns, a plurality of types of unit patterns in which arrangements (arrangement orders, pattern shapes, and the like) of the first structure element, the second structure element, and the third structure element are different from each other.

In the above polarization splitting device, a refractive index difference between the substrate and the material of the plurality of structure elements may be 0.25 or more. According to the above configuration, splitting and focusing of the polarization components of the object light by using the structure element pattern including the plurality of structure elements can be suitably realized.

In the above polarization splitting device, as for the material constituting the plurality of structure elements, the material of the plurality of structure elements may be a dielectric material. Further, the material of the plurality of structure elements may be a semiconductor material or an oxide material.

In the above polarization splitting device, the first to sixth focal positions at which the first to sixth polarization components of the object light are respectively focused may be respectively arranged at vertices of a regular hexagon set on the focal plane. According to the above configuration, it is possible to suitably perform focusing of each of the polarization components of the object light, detection of each polarization component by the photodetector, and the like.

The optical receiver apparatus according to the above embodiment includes the polarization splitting device of the above configuration; and a photodetection unit for detecting the first to sixth polarization components of the object light respectively focused at the first to sixth focal positions on the focal plane. According to the above configuration, it is possible to suitably detect the light intensity of each of the first to sixth polarization components of the object light which are split and focused by the polarization splitting device described above in the photodetection unit.

In the above optical receiver apparatus, the photodetection unit may include first to sixth photodetectors respectively arranged at the first to sixth focal positions, and for detecting the first to sixth polarization components. Further, the photodetection unit may have a configuration in which a single photodetector such as an imaging device for detecting the first to sixth polarization components is provided, for example, in addition to the configuration in which the photodetectors for individually detecting the respective polarization components are provided as described above.

The above optical receiver apparatus may further include an analysis unit for performing analysis on a detection result of the first to sixth polarization components by the photodetection unit to obtain Stokes parameters of the object light. The above configuration is suitable, for example, in the case in which the optical receiver apparatus is applied to the optical communication by using the SVM-DD method.

INDUSTRIAL APPLICABILITY

The embodiments can be used as a polarization splitting device and an optical receiver apparatus capable of suitably performing splitting and focusing of polarization components of object light with a simple configuration.

REFERENCE SIGNS LIST

1A—optical receiver apparatus, 10—polarization splitting device, 11—substrate, 12—upper surface, 13—lower surface, 15—polarization splitting layer, 20—structure element pattern, 21—first structure element pattern, 22—second structure element pattern, 23—third structure element pattern, 25, 251, 252, 25*a*-25*d*—unit pattern, 26, 261, 262—first structure element, 27, 271, 272—second structure element, 28, 281, 282—third structure element,

30—photodetection unit, 311, 312, 321, 322, 331, 332—photodetector, 35—focal plane, 50—analysis unit, 60—optical fiber, 2A—measurement system, 101—laser light source, 102—polarization controller, 103—fiber collimator, 104—polarizer, 105—half wave plate, 106—quarter wave plate, 107—iris, 108—objective lens, 109—tube lens, 110—imaging device, $L_0$—object light, $L_{11}$—x direction linear polarization component, $L_{12}$—y direction linear polarization component, $L_{21}$—+45° linear polarization component, $L_{22}$—−45° linear polarization component, $L_{31}$—left-handed circular polarization component, $L_{32}$—right-handed circular polarization component.

The invention claimed is:

1. A polarization splitting device comprising:

a substrate having a transmitting property for object light; and a polarization splitting layer made of a material having a transmitting property for the object light and with a refractive index higher than that of the substrate, having a structure element pattern including a plurality of structure elements each having two-fold rotational symmetry, and formed on an upper surface of the substrate, wherein the polarization splitting device has a configuration of a transmission type in which one surface of a lower surface of the substrate and an upper surface of the polarization splitting layer is set as a light incident surface, and another surface is set as a light output surface, the polarization splitting layer is configured to split first to sixth polarization components included in the object light incident from the light incident surface, and focus the first to sixth polarization components respectively at first to sixth focal positions different from each other on a focal plane set on the light output surface, and wherein the structure element pattern includes:

a first structure element pattern including a plurality of first structure elements, and configured to focus the first polarization component and the second polarization component respectively at the first focal position and the second focal position;

a second structure element pattern including a plurality of second structure elements, and configured to focus the third polarization component and the fourth polarization component respectively at the third focal position and the fourth focal position; and a third structure element pattern including a plurality of third structure elements, and configured to focus the fifth polarization component and the sixth polarization component respectively at the fifth focal position and the sixth focal position, and wherein a pattern of a linear shape or a triangular shape constituted by the first structure element, the second structure element, and the third structure element is set as a unit pattern, and a plurality of unit patterns are two-dimensionally arranged on the upper surface of the substrate.

2. The polarization splitting device according to claim 1, wherein a size of each of the plurality of structure elements constituting the structure element pattern on the upper surface of the substrate, and a height of each of the plurality of structure elements from the upper surface of the substrate are respectively set to be less than a wavelength of the object light.

3. The polarization splitting device according to claim 1, wherein an arrangement distance of the plurality of structure elements in the structure element pattern is set to be less than a wavelength of the object light.

4. The polarization splitting device according to claim 1, wherein the structure element having the two-fold rotational symmetry is an elliptical post.

5. The polarization splitting device according to claim 1, wherein the first to sixth polarization components are respectively set to an x direction linear polarization component, a y direction linear polarization component, a +45° linear polarization component, a −45° linear polarization component, a left-handed circular polarization component, and a right-handed circular polarization component.

6. The polarization splitting device according to claim 1, wherein the unit pattern is a pattern of an equilateral triangular shape, and the structure element pattern is set to a pattern with a hexagonal lattice arrangement.

7. The polarization splitting device according to claim 1, wherein the unit pattern is a pattern of an isosceles right triangular shape, and the structure element pattern is set to a pattern with a square lattice arrangement.

8. The polarization splitting device according to claim 1, wherein the structure element pattern includes, as the plurality of unit patterns, a first unit pattern including a structure element out of the first structure elements used for focusing of one polarization component of the first polarization component and the second polarization component, a structure element out of the second structure elements used for focusing of one polarization component of the third polarization component and the fourth polarization component, and a structure element out of the third structure elements used for focusing of one polarization component of the fifth polarization component and the sixth polarization component; and a second unit pattern including a structure element out of the first structure elements used for focusing of another polarization component of the first polarization component and the second polarization component, a structure element out of the second structure elements used for focusing of another polarization component of the third polarization component and the fourth polarization component, and a structure element out of the third structure elements used for focusing of another polarization component of the fifth polarization component and the sixth polarization component.

9. The polarization splitting device according to claim 1, wherein the structure element pattern includes, as the plurality of unit patterns, a plurality of types of unit patterns in which arrangements of the first structure element, the second structure element, and the third structure element are different from each other.

10. The polarization splitting device according to claim 1, wherein a refractive index difference between the substrate and the material of the plurality of structure elements is 0.25 or more.

11. The polarization splitting device according to claim 1, wherein the material of the plurality of structure elements is a dielectric material.

12. The polarization splitting device according to claim 1, wherein the material of the plurality of structure elements is a semiconductor material or an oxide material.

13. The polarization splitting device according to claim 1, wherein the first to sixth focal positions are respectively arranged at vertices of a regular hexagon set on the focal plane.

14. An optical receiver apparatus comprising:

the polarization splitting device according to claim 1; and a photodetection unit configured to detect the first to sixth polarization components of the object light respectively focused at the first to sixth focal positions on the focal plane.

15. The optical receiver apparatus according to claim 14, wherein the photodetection unit includes first to sixth photodetectors respectively arranged at the first to sixth focal positions, and configured to detect the first to sixth polarization components.

16. The optical receiver apparatus according to claim 14, further comprising an analysis unit configured to perform analysis on a detection result of the first to sixth polarization components by the photodetection unit to obtain Stokes parameters of the object light.

* * * * *